US008538186B2

(12) United States Patent
Saito et al.

(10) Patent No.: US 8,538,186 B2
(45) Date of Patent: Sep. 17, 2013

(54) IMAGE PROCESSING APPARATUS, IMAGING APPARATUS, AND IMAGE PROCESSING METHOD

(75) Inventors: Takahiro Saito, Yokohama (JP); Yuki Ishii, Chigasaki (JP); Nobuyuki Watanabe, Yokohama (JP)

(73) Assignees: Kanagawa University, Kanagawa (JP); Olympus Corporation, Tokyo (JP)

( * ) Notice: Subject to any disclaimer, the term of this patent is extended or adjusted under 35 U.S.C. 154(b) by 0 days.

(21) Appl. No.: 13/477,225

(22) Filed: May 22, 2012

(65) Prior Publication Data

US 2012/0293714 A1 Nov. 22, 2012

Related U.S. Application Data

(60) Division of application No. 12/498,845, filed on Jul. 7, 2009, now Pat. No. 8,189,940, which is a continuation of application No. PCT/JP2007/070770, filed on Oct. 18, 2007.

(30) Foreign Application Priority Data

Jan. 10, 2007 (JP) ................................ 2007-002655

(51) Int. Cl.
*G06K 9/40* (2006.01)
*G06K 9/00* (2006.01)
*G06K 9/64* (2006.01)

(52) U.S. Cl.
USPC ............................ 382/254; 382/167; 382/278

(58) Field of Classification Search
USPC ......................................... 382/254, 167, 278
See application file for complete search history.

(56) References Cited

U.S. PATENT DOCUMENTS

| 5,225,898 | A  | * | 7/1993 | Imai et al. ..................... 348/624 |
| 5,432,869 | A  | * | 7/1995 | Matsumoto et al. .......... 382/274 |
| 5,635,990 | A  |   | 6/1997 | Yi |
| 6,904,169 | B2 | * | 6/2005 | Kalevo et al. ................. 382/167 |
| 2006/0066736 | A1 |  | 3/2006 | Tsuruoka |
| 2007/0132864 | A1 |  | 6/2007 | Tsuruoka |
| 2008/0027994 | A1 | * | 1/2008 | Guan ......................... 707/104.1 |

FOREIGN PATENT DOCUMENTS

| JP | 5347723 | 12/1993 |
| JP | 6178163 | 6/1994 |

(Continued)

OTHER PUBLICATIONS

Aujol, Jean-François and Kang, Sung Ha, "Color image decomposition and restoration" Journal of Visual Communication and Image Representation, vol. 17, pp. 916-928, 2006.*

(Continued)

*Primary Examiner* — Utpal Shah
(74) *Attorney, Agent, or Firm* — Volpe and Koenig, P.C.

(57) ABSTRACT

An image processing apparatus includes a parameter setting unit which sets a noise reduction processing parameter for use in noise reduction processing for applying onto an original image signal including a plurality of color components; a correlation arithmetic processing unit which calculates coefficients of correlation between each of the color components in the original image signal; a parameter correcting unit which corrects the noise reduction processing parameter based on the coefficient of correlation; and a noise reducing unit which reduces noise in the original image signal using the corrected noise reduction processing parameter.

9 Claims, 20 Drawing Sheets

(56) References Cited

FOREIGN PATENT DOCUMENTS

| JP | 787418 | 3/1995 |
| JP | 8172552 | 7/1996 |
| JP | 09-050519 | 2/1997 |
| JP | 09-121366 | 5/1997 |
| JP | 2001157057 | 6/2001 |
| JP | 2001175843 | 6/2001 |
| JP | 2005-110235 | 4/2005 |
| JP | 200623959 | 1/2006 |
| JP | 2006101006 | 4/2006 |
| JP | 9224172 | 7/2009 |

OTHER PUBLICATIONS

Office Action issued on Jul. 10, 2012 in counterpart Japanese Patent Application No. 2010-053160.
Aujol, et al., Structure-Texture Image Disposition Modeling, Algorithms, and Parameter Selection, UCLA, Department of Mathmetics, Los Angeles, CA 90095, Jul. 28, 2005.
International Search Report from corresponding International Application No. PCT/JP2007/070770.
English translation of the International Preliminary Report on Patentability from International Application No. PCT/JP2007/070770.

* cited by examiner

IMAGE PROCESSING APPARATUS, IMAGING APPARATUS, AND IMAGE PROCESSING METHOD

CROSS REFERENCE TO RELATED APPLICATIONS

This application is a division of U.S. patent application Ser. No. 12/498,845, filed on Jul. 7, 2009, which is a continuation of International Patent Application No. PCT/JP2007/070770, filed on Oct. 18, 2007, which claims the benefit of Japanese Patent Application No. JP 2007-002655, filed on Jan. 10, 2007, which are incorporated by reference as if fully set forth.

FIELD OF THE INVENTION

The present invention relates to a reduction of noise included in image signals.

BACKGROUND OF THE INVENTION

In Japanese patent un-examined publication JP2001-157057A, the relationship between the amount of the luminance noise N and the signal level D which is converted to the density value is expressed with a function, $N=ab^{cD}$. Here, a, b, and c are constant terms and are statically provided. However, since the amount of the luminance noise changes dynamically due to reasons such as the temperature, the exposure duration, and the gain during the shooting, the above method that uses static constant terms cannot deal with expressing the relationship with a function by adapting with the amount of noise originated during the shooting, and it is therefore inferior in the accuracy of the presumption of the amount of noise. Moreover, although the frequency characteristics of the filtering is controlled using the amount of noise, since this filtering processes the flat region and the edge region in the image equivalently without distinguishing from each other, the edge region in an area that is presumed as having a large amount of noise from the signal level is deteriorated, and therefore, the preservation of the original signal was not highly achieved. Furthermore, it cannot deal with color noise originated between the color signals.

In Japanese patent un-examined publication JP2001-175843A, an input signal is separated into a luminance signal and a color difference signal, edge intensity is obtained based on those signals, and smoothing processing is performed to the color difference signal in flat areas other than the edge region, and wherein this smoothing processing is fixedly performed regardless of the signal level. However, since the amount of the color noise differs with the signal level, the smoothing processing cannot be optimally controlled, and it is possible that the color noise component remains or the deterioration of the original signal occurs, for example.

In order to deal with this problem, JP2006-023959A proposes a method that obtains the similarities of the hues, divides into areas, and applies a noise model for each area, during the noise coring processing based on the noise models. Additionally, JP2006-101006A proposes a method that obtains a threshold for the coring based on the noise model using the average value of a pixel of interest and its neighborhood in order to presume the luminance level, performs a segmentation of the image again in accordance with the similarity of the pixel within the threshold, and applies a noise model for each area.

SUMMARY OF THE INVENTION

According to an aspect of the present invention, an image processing apparatus comprising: a parameter setting unit which sets a noise reduction processing parameter for use in noise reduction processing for applying onto an original image signal including a plurality of color components; a correlation arithmetic processing which calculates coefficients of correlation between each of the color components in the original image signal; a parameter correcting unit which corrects the noise reduction processing parameter based on the coefficient of correlation; and a noise reducing unit which reduces noise in the original image signal using the corrected noise reduction processing parameter, is provided.

According to another aspect of the present invention, an image processing apparatus comprising: a component separating unit which separates an original image signal comprising a plurality of color components into a plurality of components including a first component which is a skeleton component including a flat component and an edge component of an image, and a second component which is obtained from a residual of the original image signal after the first component is removed; a signal level acquiring unit which acquires a signal level of a luminance component of the first component or a signal level of a signal obtained by interpolating a G component; a parameter setting unit which sets a noise reduction processing parameter corresponding to each of the color components of the second component based on the signal level of the luminance component of the first component or the signal level of the signal obtained by interpolating the G component of the first component; and a noise reducing unit which reduces noise in each of the color components of the second component using the noise reduction processing parameter of the corresponding color component, is provided.

According to yet another aspect of the present invention, an imaging apparatus comprising: an imaging device at a front of which a color filter array is arranged; a parameter setting unit which sets a noise reduction processing parameter for use in noise reduction processing for applying onto an original image signal including a plurality of color components obtained from the imaging device; a correlation arithmetic processing unit which calculates a coefficient of correlation between each of the color components in the original image signal; a parameter correcting unit which corrects the noise reduction processing parameter based on the coefficient of correlation; and a noise reducing unit which reduces noise in the original image signal using the corrected noise reduction processing parameter, is provided.

According to yet another aspect of the present invention, an imaging apparatus comprising: an imaging device at a front of which a color filter array is arranged; a component separating which separates an original image signal comprising a plurality of color components obtained from the imaging device into a plurality of components including a first component which is a skeleton component including a flat component and an edge component of an image, and a second component which is obtained from a residual of the original image signal after the first component is removed; a signal level acquiring which acquires a signal level of a luminance component of the first component or a signal level of a signal obtained by interpolating a G component of the first component; a parameter setting unit which sets a noise reduction processing parameter corresponding to each of the color components of the second component based on the signal level of the luminance component of the first component or the signal level of the signal obtained by interpolating the G component; and a noise reducing unit which reduces noise in each of the color components of the second component using the noise reduction processing parameter of the corresponding color component, is provided.

According to yet another aspect of the present invention, a method for processing an image comprising: a parameter setting step for setting a noise reduction processing parameter for use in noise reduction processing to an original image signal including a plurality of color components; a correlation arithmetic processing step for calculating a coefficient of correlation between each of the color components in the original image signal; a parameter correcting step for correcting the noise reduction processing parameter based on the coefficient of correlation; and a noise reducing step for reducing noise in the original image signal using the corrected noise reduction processing parameter, is provided.

According to yet another aspect of the present invention, a method for processing an image comprising: a component separating step for separating an original image signal comprising a plurality of color components into a plurality of components including a first component which is a skeleton component including a flat component and an edge component of an image, and a second component which is obtained from a residual of the original image signal after the first component is removed; a signal level acquiring step for acquiring a signal level of a luminance component of the first component or a signal level of a signal obtained by interpolating a G component; a parameter setting step for setting a noise reduction processing parameter corresponding to each of the color components of the second component based on the signal level of the luminance component of the first component or the signal level of the signal obtained by interpolating the G component of the first component; and a noise reducing step for reducing noise in each of the color components of the second component using the noise reduction processing parameter of the corresponding color component, is provided.

Embodiments and advantages of this invention will be described in detail below with reference to the attached figures.

DETAILED DESCRIPTION OF THE INVENTION

Hereinafter, embodiments of the present invention will be described with reference to the accompanying drawings.

First Embodiment

Figure 1:
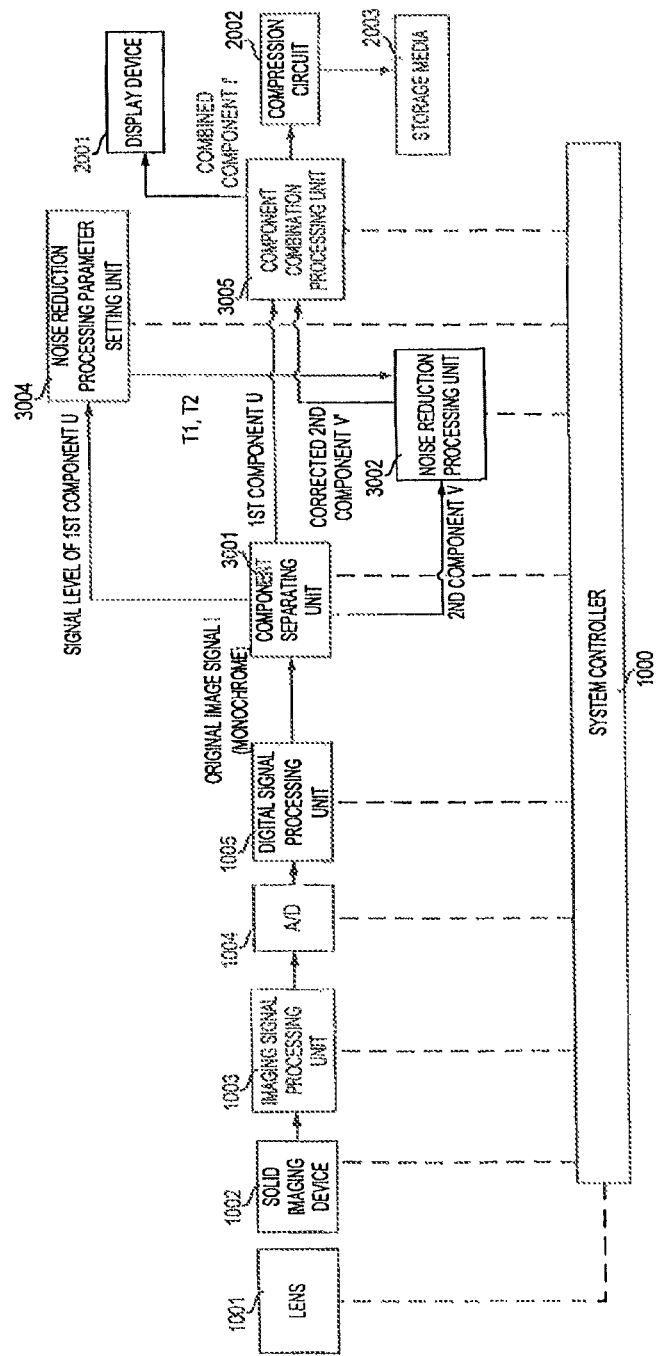
FIG. 1 depicts a system configuration diagram of an imaging apparatus according to a first embodiment.

FIG. 1 depicts a system configuration diagram of an imaging apparatus according to a first embodiment of the present invention. In FIG. 1, a solid line represents a data signal line and a dashed line represents a control signal line, and each processing unit is controlled by a system controller 1000.

The original image that comes through a lens 1001 is converted to the electric signal at a solid state imaging device 1002, such as CCD and CMOS, and undergoes a CDS (Correlated Double Sampling)/Differential Sampling, analog gain adjustment, etc., at an imaging signal processing unit 1003. Thereafter, it is converted to a digital signal at an A/D conversion unit 1004, and is converted to an image signal (an original image signal I) having a certain tone at a digital signal processing unit 1005. In the first embodiment, the solid state imaging device 1002 is a monochrome imaging device, and the original image signal I is a monochrome signal.

At a component separating unit 3001, the original image signal I is separated into a first component U and a second component V. The first component U is a skeleton component (having a geometrical image structure) of the original image signal I that includes a flat component (a mildly changing component) and an edge component, and the second component V is a residual component of the original image signal I after the first component U is removed, and includes a fine structural component such as textures, and the noise. Since the original image signal I is a monochrome signal, each of the components U, V that is separated from the original image signal I respectively becomes a luminance component.

For simplifying the explanation, a case that separates the original image signal I into two components will be described, but the original image signal I may be separated into three or more components. Furthermore, there are an addition type separation and a multiplication type separation as a method for separating a component, and their details will be described later.

Figure 2:
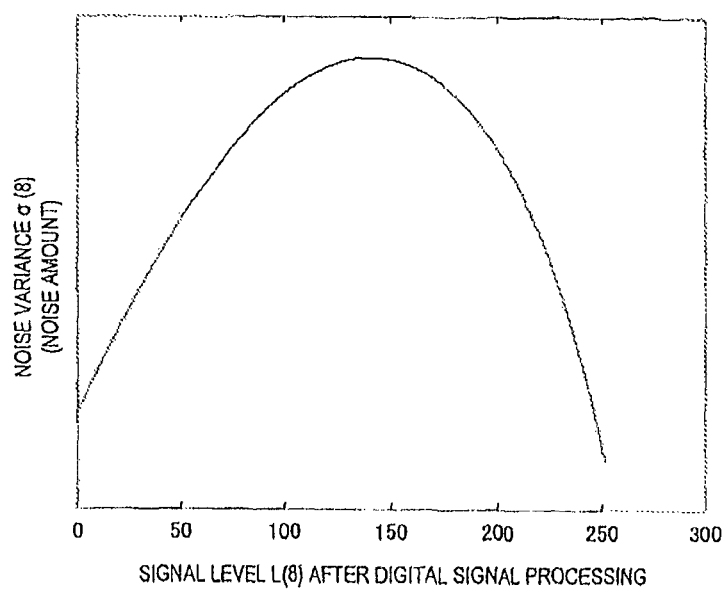
FIG. 2 depicts a signal level to noise variance model after the digital signal processing.

At the noise reduction processing parameter setting unit 3004, a signal level to noise variance model shown in FIG. 2 or its approximate data is referenced to acquire a noise variance σ (noise amount) that corresponds to the signal level of the first component U. Since the first component U is a skeleton component of the original image signal I, the noise variance σ obtained from the signal level of the first component U is nearly equal to the noise variance σ included in the original image signal I. Then, noise reduction processing parameters T1, T2 that correspond to the noise variance σ are set and transmitted to a noise reduction processing unit 3002.

The noise reduction processing parameters T1, T2 are set to values that are proportional to the noise variance σ, respectively, by the following Expression (1), for example:

$$T1 = k\sigma$$
$$T2 = -k\sigma \tag{1}$$

Here, k is a coefficient, and is ½, for example. The details of the signal level to noise variance model will be described later.

In the noise reduction processing unit 3002, soft decision threshold processing (coring processing) is performed to the second component V using the noise reduction processing parameters T1, T2. Since the second component V includes a similar level of noise to the noise included in the original image signal I, the noise included in the second component V is effectively reduced with this process. Then, the obtained value is transmitted to a component combination processing unit 3005 as a corrected second component V'. The details of the soft decision threshold processing will be described later.

In the component combination processing unit 3005, the first component U and the corrected second component V' are combined in a predetermined proportion, e.g. 1:1, to obtain a combined component I' in which the noise is reduced compared to the original image signal I. The combined component I' is transmitted to a displaying device 2001, such as LCDs, and is also transmitted to a storage media 2003 consisted of flash memory etc. via a compression circuit 2002.

Figure 3:
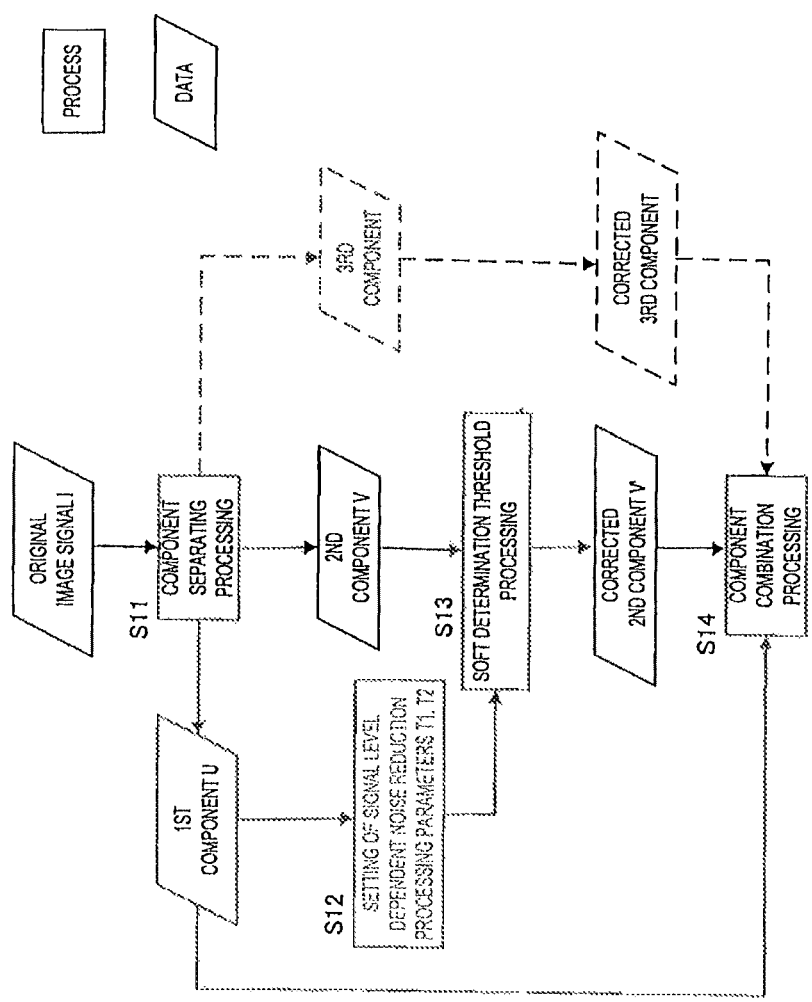
FIG. 3 depicts a flow chart that corresponds to a process from a component separating unit to a component combination processing unit in the first embodiment.

FIG. 3 depicts a flow chart that corresponds to a process from the component separating unit 3001 to the component combination processing unit 3005. In the figure, processing for the case where the original image signal I is separated into three components is represented with dashed lines for illustration, but the case where it is separated into two components will be described herein.

In step S11, the original image signal I is separated into the first component U and the second component V.

In step S12, the noise variance σ is acquired based on the signal level of the first component U with reference to the signal level to noise variance model shown in FIG. 2 or its approximate data. Then, the noise reduction processing parameters T1, T2 are set according to the noise variance σ.

In step S13, soft decision threshold processing is performed to the second component V using the noise reduction processing parameters T1, T2, to reduce the noise included the second component V, and to obtain the corrected second component V'.

In step S14, the first component U and the corrected second component V' are combined to obtain a combined component I' in which the noise is reduced compared to the original image signal I.

In the following, details of the component separation of the original image signal I will be described, which is performed at the component separating unit 3001. Upon extracting the first component U from the original image signal I, a process that maintains the skeleton component of the original image signal I is used, which includes a flat component (mildly changing component) and edge component. As described above, there are an addition type separation and a multiplication type separation for a component separation method, and these methods are described below, respectively.

Addition Type Separation

In the addition type separation, the original image signal I is represented as a sum of the first component U and the second component V as shown in the following Expression (2):

$$I = U + V \tag{2}$$

First, a separation method using a bounded variation function and a norm will be described now.

An A²BC variational model (Aujol-Aubert-Blanc-Feraud-Chambolle model) disclosed in the following document is used in order to perform the separation:

Document: Jean-Francois Aujol, Guy Gilboa, Tony Chan & Stanley Osher, Structure-Texture Image Decomposition-Modeling, Algorithms, and Parameter Selection, International Journal of Computer Vision, Volume 67, Issue 1 (April 2006) Pages: 111-136 Year of Publication: 2006.

The characteristics of the first component U obtained as an optimum solution is modeled as a bounded variation function space BV constructed from a plurality of "small areas with smooth changes in the luminance" which is sectioned with discontinuous boundaries, and the energy of the first component U is defined as TV (total variation) norm J(U) in the following Expression (3):

$$J(U) = \int \|\nabla U\| dx\, dy \tag{3}$$

On the other hand, the function space of the second component V in Expression (2) is modeled as an oscillating function space G. The oscillating function space G is a space of a function expressed as in the following Expression (4) by oscillation generating functions $g_1$, $g_2$ and its energy is defined as G norm $\|V\|_G$ in the following Expression (5):

$$V_{(x,y)} = \partial g_{1(x,y)} + \partial_x g_{2(x,y)}; g_1, g_2 \in L_\infty(R^2) \tag{4}$$

$$\|V\|_G = \inf_{g1,g2} \{\|(g_1)^2 + (g_2)^2\|_{L_\infty}; V = \partial_x g_1 + \partial_x g_2\} \tag{5}$$

The separation problem of the original image signal I is formulated as a variational problem shown in the following Expression (6) that minimizes the energy function. This variational problem can be solved by a Chambolle Projection method:

$$\inf_{U, V \in G_\mu} \left\{ J(U) + \frac{1}{2\alpha} \|I - U - V\|_{L2}^2 \right\} \tag{6}$$

$$\alpha > 0,\ \mu > 0,\ G_\mu = \{V \in G \mid \|V\|_G \leq \mu\}$$

Although the second component V separated from the original image signal I is influenced by the noise, the first component U is nearly not influenced by the noise, and consequently, the skeleton component (geometrical image structure) can be extracted without the edge being obtuse.

Examples of other addition type separation methods include performing a low range separation by a linear filter, and an adaptive smoothing by a median filter, a morphologic filter, etc. In the following, examples of methods for the addition type separation that do not use a bounded variation function will be shown now:

Example 1

A method that uses low order components of an orthogonal basis expansion performed to the original image signal I as the first component U, and that uses the residual of the original image signal I after the first component U is removed as the second component V.

Example 2

A method that uses the result of the median filter processing performed to the original image signal I as the first component U, and that uses the residual of the original image signal I after the first component U is removed as the second component V.

Example 3

A method that uses the result of applying a multiple value morphologic filter to the original image signal I as the first component U, and that uses the residual of the original image signal after the first component U is removed as the second component V.

Example 4

A method that uses the result of applying contraction processing to the original image signal I and further applying expansion processing as the first component U, and that uses the residual of the original image signal after the first component U is removed as the second component V.

Example 5

A method that uses the result of applying a Bilateral filter to the original image signal I as the first component U, and that uses the residual of the original image signal after the first component U is removed as the second component V.

Multiplication Type Separation

The method for the multiplication type separation will now be described. In the multiplication type separation, the original image signal I is represented by the product of the first component U and the second component V, but if the original image signal I is converted by a logarithmic conversion to obtain a logarithmic original image signal f, it is able to convert to an addition type separation problem as in the following Expression (7):

$$I = U*V$$

$$f = u+v;$$

$$f = \log I, u = \log U, v = \log V \quad (7)$$

A separation method which uses a bounded variation function and a norm as in the above will be described now. The multiplication type separation problem is solved by using the $A^2BC$ variational model in the log domain as in the addition type separation. Hereinafter, the $A^2BC$ variational model in the log domain will be briefly described assuming that the multiplication type separation is performed.

The functional space of the logarithmic first component u in Expression (7) is modeled as a bounded variation function space BV constructed with a plurality of "small areas with smooth changes in the luminance" which is sectioned with discontinuous boundaries as in the first component U of the aforementioned addition type separation model, and the energy of the logarithmic first component u is defined as TV (total variation) norm J(u) in the following Expression (8):

$$J(u) = \int \|\nabla u\| dx\, dy \quad (8)$$

On the other hand, the function space of the logarithmic second component v in Expression (7) is modeled as an oscillating function space G. The oscillating function space G is a space of a function expressed as in Expression (9) by the oscillation generating functions $g_1$, $g_2$, and its energy is defined as G norm $\|v\|_G$ in Expression (10):

$$v_{(x,y)} = \partial_x g_{1(x,y)} + \partial_x g_{2(x,y)}; g_1, g_2 \in L_\infty(R^2) \quad (9)$$

$$\|v\|_G = \inf_{g1,g2} \{\|(g_1)^2 + (g_2)^2\|_{L_\infty}; v = \partial_x g_1 + \partial_x g_2\} \quad (10)$$

Therefore, the separation problem of the logarithmic original image signal f is formulated as a variational problem in the following Expression (11) that minimizes the energy functional:

$$\inf_{U,V \in G_\mu} \left\{ J(u) + \frac{1}{2\alpha} \|f - u - v\|_{L2}^2 \right\} \quad (11)$$

$$\alpha > 0, \mu > 0, G_\mu = \{v \in G \mid \|v\|_G \le \mu\}$$

Thereby, although the second component V that is separated from the original image signal I is influenced by the noise, the first component U is nearly not influenced by the noise, and the skeleton component (the geometrical image structure) is extracted without the edge being obtuse.

The signal level to noise variance model which is referred to by the noise reduction processing parameter setting unit 3004 will be described now.

If we suppose that the noise included the original image signal I is Gaussian noise, the noise variance σ(noise amount) increases in a quadratic curve to the signal level $L_0$ immediately after the A/D conversion. By expressing the signal level to noise variance model with a quadratic function as disclosed in JP2005-175718A, the following Expression (12) is obtained:

$$\sigma = \alpha L_0^2 + \beta L_0 + \gamma \quad (12)$$

Figure 4:
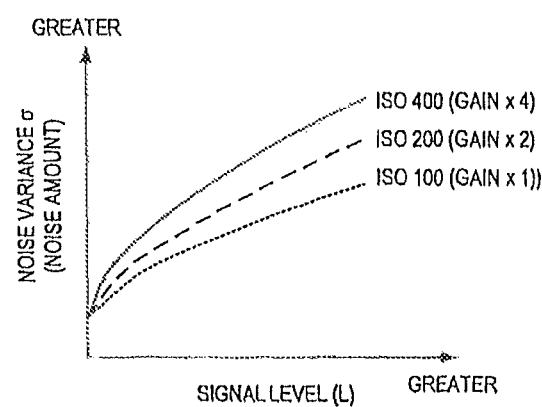
FIG. 4 depicts a characteristics graph showing a relationship between the signal level and the noise variance immediately after an A/D conversion.

Here, α, β, and γ are constant terms. However, the noise variance σ changes not only by the signal level but also by the temperature of the devices and the gain. FIG. 4 plots the noise variance σ to three kinds of ISO sensitivities (gains) 100, 200, and 400 that is related to the gain at a particular temperature t, as an example. The individual curve shows a form shown in Expression (12), but its coefficient differs according to the ISO sensitivity that is related to the gain. By formulating the signal level to noise variance model expressing the temperature as t and the gain as g and considering the above, we obtain:

$$\sigma = \alpha_{gt} L_0^2 + \beta_{gt} L_0 + \gamma_{gt} \quad (13)$$

Here, $\alpha_{gt}$, $\beta_{gt}$, and $\gamma_{gt}$ are constant terms that are determined according to the temperature t and the gain g. In the case of full color, this noise model can be applied independently for each color.

However, in the first embodiment, since the component separation and the noise reduction processing are performed at a latter stage of the digital signal processing unit 1005, the aforementioned model cannot be used without modifications. Therefore, considering the characteristics of the digital signal processing unit 1005 in addition to the characteristics of the aforementioned signal level to noise variance model, a signal level to noise variance model is obtained for the signal level after the digital signal processing.

Figure 5:
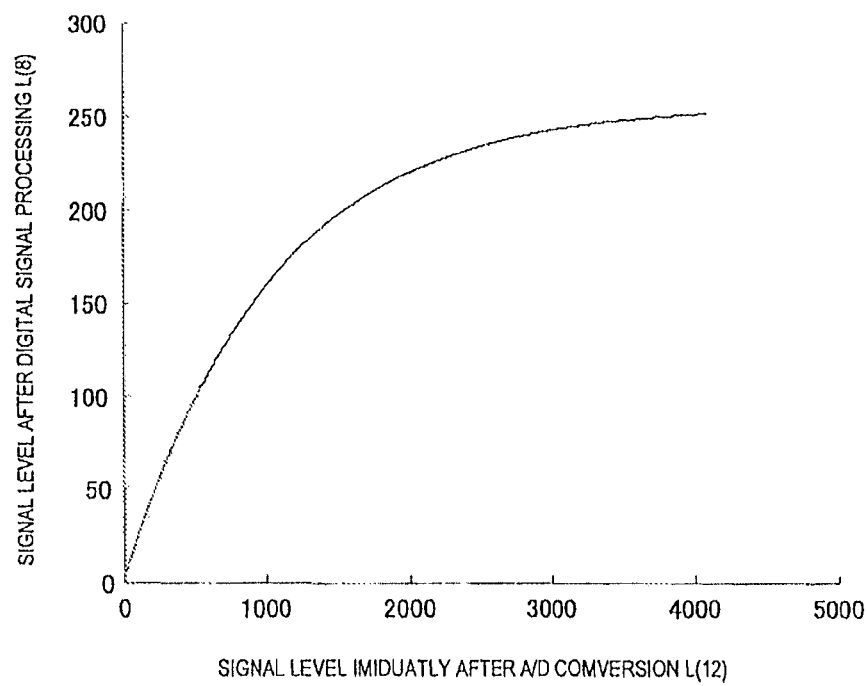
FIG. 5 depicts a characteristics graph showing input and output characteristics of a digital signal processing unit.

For example, if the digital signal processing unit 1005 performs Knee processing or a γ conversion that converts the tone from a 12-bit input signal to a 8-bit output signal, the digital signal processing unit 1005 has input and output signal characteristics as in FIG. 5. In the figure, L(12) represents a signal level immediately after the A/D conversion, and L(8) represents a signal level after the digital signal processing.

Therefore, considering the signal level to noise variance characteristics immediately after the A/D conversion in Expression (12) or (13) and the characteristics of the digital signal processing unit 1005 as in FIG. 5, the signal level Y(8) and the noise variance σ after the digital signal processing form a monomodal curve relationship (signal level to noise variance model) shown FIG. 2.

In the noise reduction processing parameter setting unit 3004, the signal level to noise variance model shown in FIG. 2 is referenced to acquire the noise variance σ, and the noise reduction processing parameters T1, T2 are set correspondingly. For the sake of simplicity, data of a polygonal line that approximated FIG. 2 may be referred to instead of FIG. 2.

Soft decision threshold processing using noise reduction processing parameters T1, T2 will be described now.

Since the second component V separated from the original image signal I includes noise as described above, the noise included in the second component V is reduced at the noise reduction processing unit 3002 by the soft decision threshold processing (coring processing), which will be described later.

The soft decision threshold processing is signal processing in which a relationship between the signal value A before the processing and the signal value D after the processing is expressed by the following Expression (14), assuming that the reference value is B, the upper threshold is C1=B+T1 (T1>0), and the lower threshold is C2=B+T2 (T2<0):

In the case of $B+T1<A: D=A-T1$

In the case of $B+T2<A<B+T1: D=B$

In the case of $A<B+T2: D=A-T2$ (14)

Figure 6:
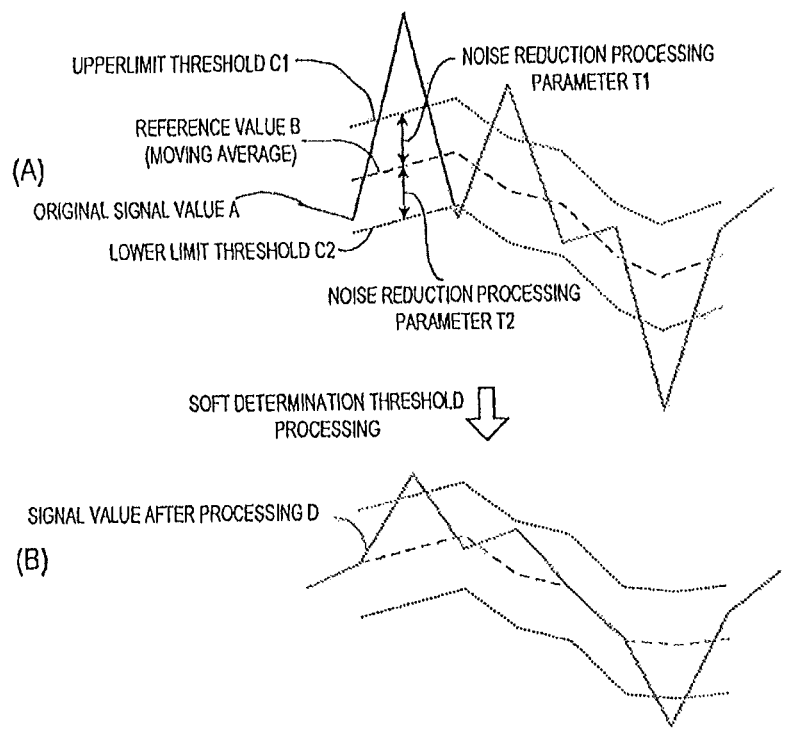
FIG. 6 depicts a diagram for illustrating soft decision threshold processing.

FIG. 6 illustrates how the soft decision threshold processing is performed. When the soft decision threshold processing is performed to the one-dimensional signal value A shown in FIG. 6(*a*), the signal value D shown in FIG. 6(*b*) is obtained. The reference value B here uses a moving average of the signal value A.

In the first embodiment, aforementioned soft decision threshold processing is performed to the second component V separated from the original image signal I. Since the second component V was being removed of the first component which is a skeleton component from the original image signal I, the reference value B can be considered as zero.

Figure 7:
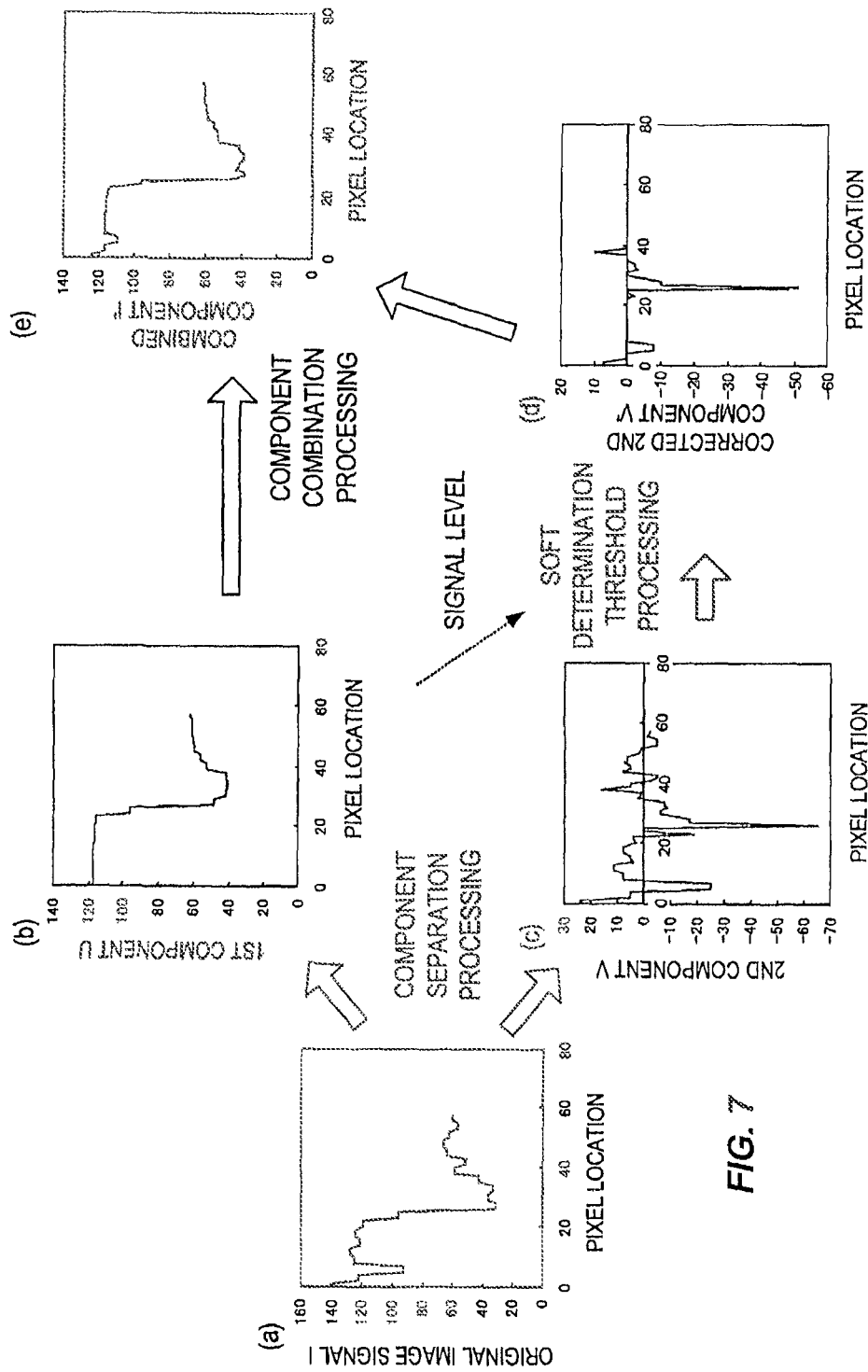
FIG. 7 depicts a chart showing how noise is reduced by noise reduction processing.

FIG. 7 illustrates a situation where the noises of the original image signal I are reduced by an aforementioned component separation and the noise reduction processing.

FIG. 7(*a*) shows an original image signal I expressed in one-dimension and includes noise.

FIG. 7(*b*) shows the first component U separated from the original image signal I by the component separating unit 3001. The first component U is a skeleton component including a flat component and an edge component, and nearly does not include the noise.

FIG. 7(*c*) shows the second component V obtained by the component separating unit 3001. The second component V is a residual of the original image signal after the first component U is removed, and includes noise of a similar level with the noise included in the original image signal I.

FIG. 7(*d*) shows the result of the soft decision threshold processing performed to the second component V. The noise is reduced in the corrected second component V' compared with the second component V. Typically, although it is necessary to presume an original signal without noise in order to acquire the noise variance σ by referring to the signal level to noise variance model, in the first embodiment, alternatively, it acquires the noise variance σ using the signal level of the first component U which is a skeleton component. For the sake of simplicity, the noise variance σ herein was acquired by referring to the data of a polygonal line that approximated the signal level to noise variance model shown in FIG. 2.

FIG. 7(*e*) shows the result of the combination of the first component U in FIG. 7(*b*) and the corrected second component V' in FIG. 7(*d*) in a proportion, 1:1, at the component combination processing unit 3005. As can be understood by comparing (a) and (e) in FIG. 7, the noise is reduced in the combined component I' compared with the original image signal I while also preserving the edge component. The mixing proportion of the combination can be set discretionally.

The functions and advantageous effects of the first embodiment will be described now.

Although it is necessary to presume an original image signal I without noise when presuming signal level dependent noise in the original image signal I from the signal level, the noise included the original image signal I can be presumed accurately by using the signal level of the first component U which is a skeleton component. On the other hand, noise of a similar level with the noise included the original image signal I is separated into the second component V which is a residual component of the original image signal I after the first component U is removed.

Therefore, by setting the noise reduction processing parameters T1, T2 for reducing noise in the second component V based on the signal level of the first component U, and reducing the noise in the second component V using those parameters, the noise in the second component V can be reduced effectively to provide high image quality noise reduction processing. Since the edge component is included in the first component which is a skeleton component, the edge will not be deteriorated by the noise reduction processing.

As for the noise reduction processing method, it may be of any method as long as it is signal processing dependant on the signal level, and for example, soft decision threshold processing that corrects the second component V by comparing the second component V with the threshold that corresponds to the noise reduction processing parameters T1, T2 may be utilized, as described in the above.

As for the method of the component separation, either of the aforementioned addition type separation or the multiplication type separation may be used, and not only the separation into two components but also a separation into three or more components may be used. Moreover, the noise reduction processing for the second to the Nth components is not limited the above soft decision threshold processing, and may use any method which is a process for reducing noise based of the signal level.

Second Embodiment

The second embodiment and later embodiments are embodiments that correspond to full color images. Same reference numerals are assigned and the descriptions are omitted for the structures in common with the first embodiment.

Figure 8:
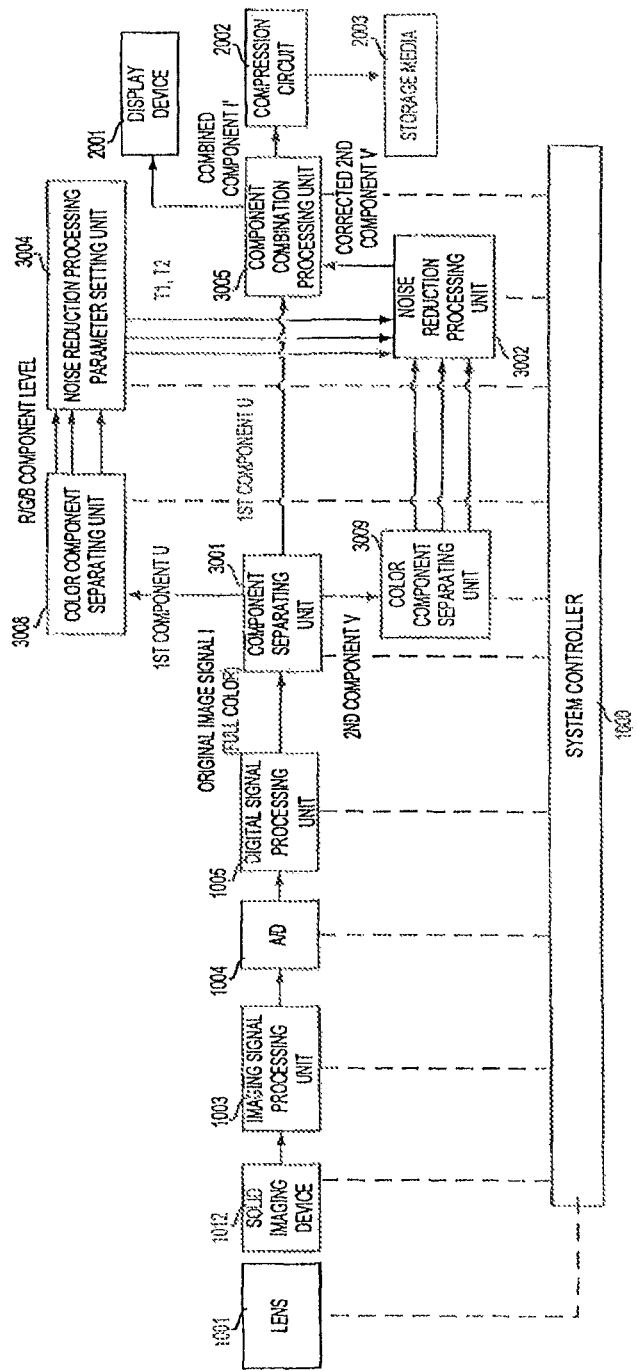
FIG. 8 depicts a system configuration diagram of an imaging apparatus according to a second embodiment.

FIG. 8 depicts a system configuration diagram of the imaging apparatus according to the second embodiment, and the solid state imaging device 1012 is a full color imaging device that has a color filter array in the front. The solid state imaging device 1012 may be of either a single panel type or a multi-panel type.

In the color component separating unit 3008, the first component U is separated into each of the color components (R component, G component, and B component), to acquire the signal levels for each of the color components.

At the noise reduction processing parameter setting unit 3004, the signal level to noise variance model shown in FIG. 2 or its approximate data is referred to based on the signal level of each of the color components, to acquire the noise variance σ for each color component. Then, the noise reduction processing parameters T1, T2 for each of the color components are set to values corresponding to the noise variance σ of the corresponding color component, e.g. values proportional to the noise variance σ.

In the color component separating unit 3009, the second component V obtained in the component separating unit 3001 is separated into each of the color components.

In the noise reduction processing unit 3002, the soft decision threshold processing described in the first embodiment is performed independently for each of the color components of the second component V, to reduce the noise included in each of the color components.

Figure 9:
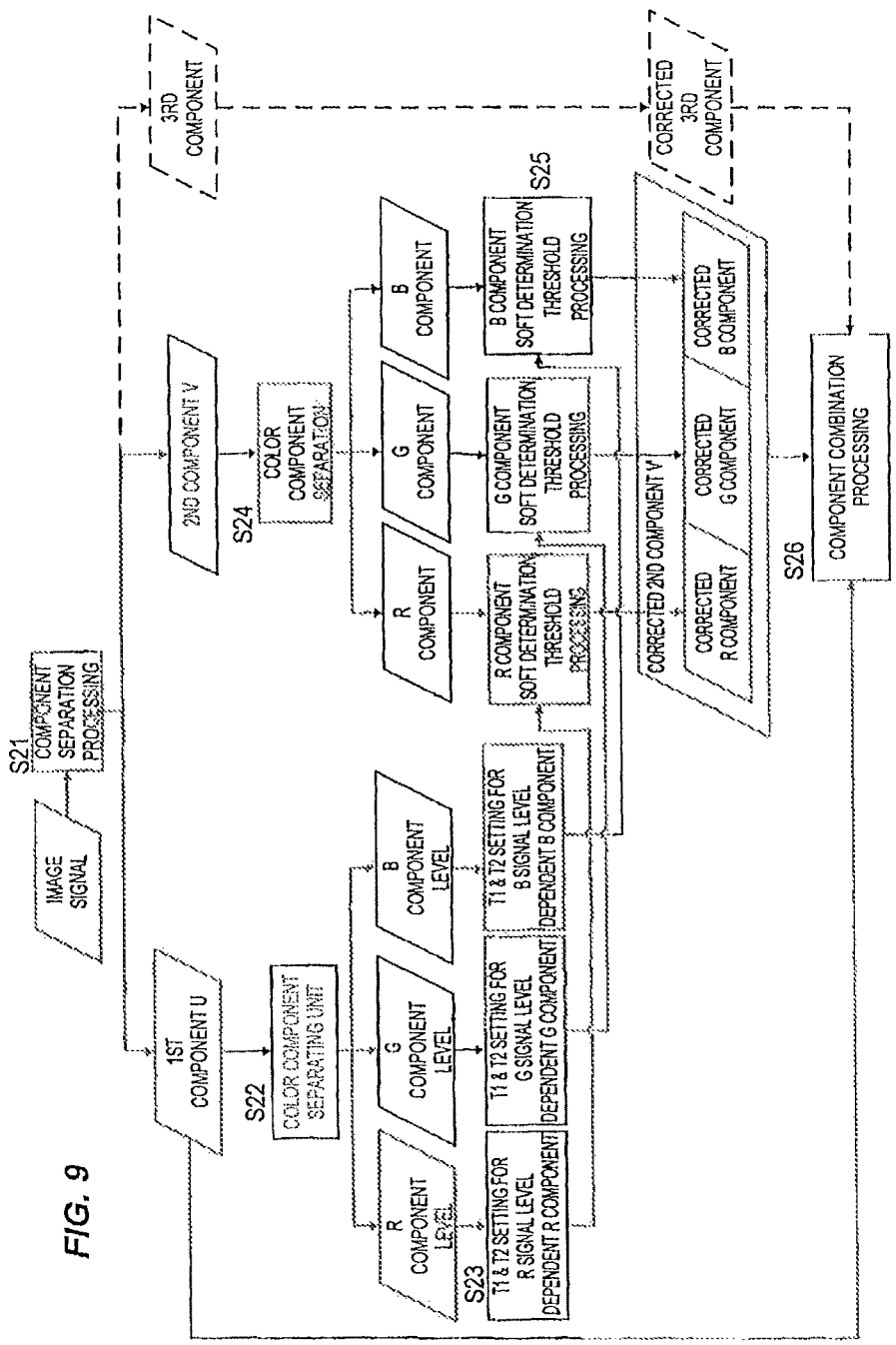
FIG. 9 depicts a flow chart that corresponds to a process from the component separating unit to the component combination processing unit in the second embodiment.

FIG. 9 depicts a flow chart showing a processing flow from the component separating unit 3001 to the component combination processing unit 3005. The process for the case where the separation into three components is performed is represented with dashed lines but the case where the separation into two components is performed will be described now.

In step S21, the original image signal I is separated into the first component U and the second component V.

In step S22, the first component U is separated into each of the color components, to obtain the signal level of each of the color components.

In step S23, the signal level to noise variance model shown in FIG. 2 or its approximate data is referred based on the signal level of each of the color components to acquire the noise variance σ for each of the color components. Then, the noise reduction processing parameters T1, T2 for each of the color components of the second component V is set according to the noise variance σ for each of the color components.

In step S24, the second component V is separated into each of the color components.

In step S25, the soft decision threshold processing that uses the noise reduction processing parameters T1, T2 of the corresponding color component is performed independently for each of the color components to each of the color components of the second component V, the values that underwent the soft decision threshold processing is assumed as the corrected second component V'.

In step S26, the first component U and the corrected second component V' are combined to obtain a combined component I' in which noise is reduced to the original image signal I.

According to this second embodiment, even if the original image signal I includes a plurality of color components, high image quality noise reduction processing can be performed while also suppressing the deterioration of the edge component, as is the same with the first embodiment.

As for the method of the component separation, either an addition type separation or a multiplication type separation may be used. As for the method of the process for reducing noise in the second component V, it is not limited to the soft decision threshold processing, and may be of any method as long as it is signal processing dependant on the signal level.

Third Embodiment

Figure 10:
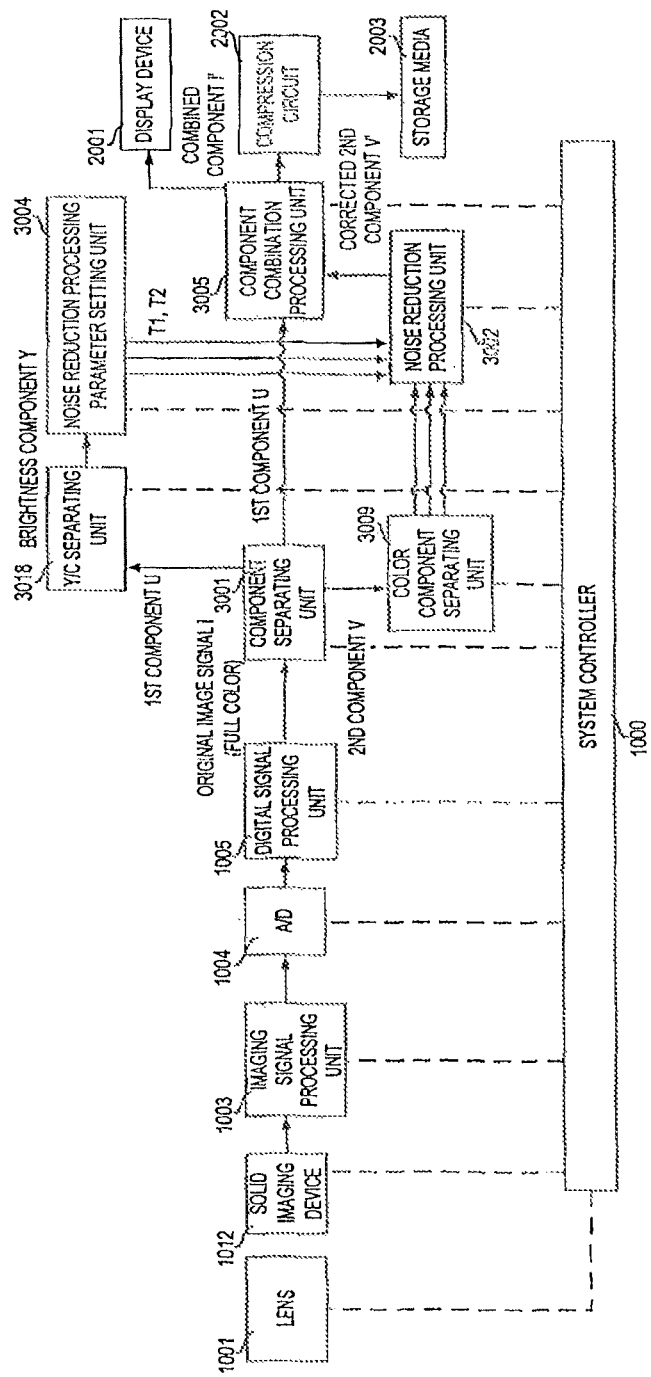
FIG. 10 depicts a system configuration diagram of an imaging apparatus according to a third embodiment.

FIG. 10 depicts a system configuration diagram of the imaging apparatus according to the third embodiment. Same reference numerals are assigned and the descriptions are omitted for the structures in common with the previous embodiments.

In the third embodiment, it includes a Y/C separating unit 3018 instead of the color component separating unit 3008. At the Y/C separating unit 3018, the first component U is separated into the luminance component Y and the color difference components Cb, Cr to acquire the signal level of the luminance component Y. The conversion from the R component, the G component and the B component that construct the first components U to the luminance component Y and the color difference components Cb, Cr is performed by the following Expression (15):

$$Y = 0.29900R + 0.58700G + 0.11400B$$

$$Cb = -0.16874R - 0.33126G + 0.50000B$$

$$Cr = 0.50000R - 0.41869G - 0.08131B$$

At the noise reduction processing parameter setting unit 3004, the signal level to noise variance model shown in FIG. 2 or its approximate data is referenced to acquire the noise variance σ for each color component that corresponds to the signal level of the luminance component Y. Then, the noise reduction processing parameters T1, T2 for each of the color components are set to values that correspond to the noise variance σ of the corresponding color components, e.g. values proportional to the noise variance σ.

At the color component separating unit 3009, the second component V obtained at the component separating unit 3001 is separated into each color component. The noise reduction processing unit 3002 performs the aforementioned soft decision threshold processing independently for each of the color components, and reduces noise included in each of the color components.

Figure 11:
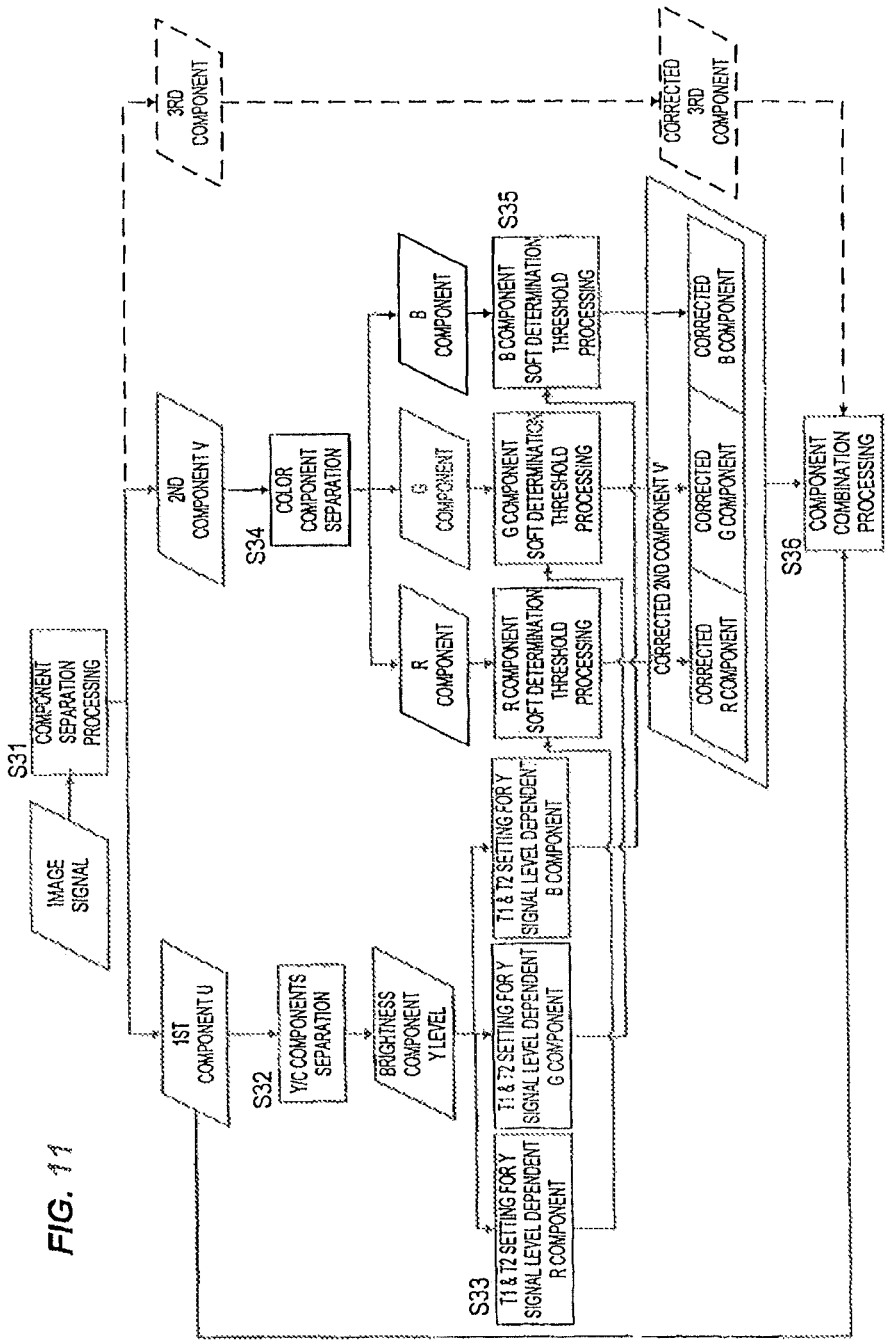
FIG. 11 depicts a flow chart that corresponds to a process from the component separating unit to the component combination processing unit in the third embodiment.

FIG. 11 depicts a flow chart that shows a process from the component separating unit 3001 to the component combination processing unit 3005. Although the processing that separates into three components are shown with dashed lines for reference, a case where the separation into two components is performed will be described now.

In step S31, the original image signal I is separated into the first component U and the second component V.

In step S32, the first component U is separated into Y/C components to obtain the signal level of the luminance component Y.

In step S33, the signal level to noise variance model shown in FIG. 2 or its approximate data is referenced to acquire the noise variance σ in accordance with the signal level of the luminance component Y for the first component U, and the noise reduction processing parameters T1, T2 are respectively set for each of the color components of the corresponding second component V.

In step S34, the second component V is separated into each of the color components.

In step S35, the soft decision threshold processing using the noise reduction processing parameters T1, T2 is performed independently for each of the color components of the second component V to obtain the corrected second component V'.

In step S36, the first component U and the corrected second component V' are combined to obtain a combined component I' in which noise is reduced from the original image signal I.

According to the third embodiment, even if the original image signal I included a plurality of color components, high image quality noise reduction processing can be performed while also suppressing the deterioration of the edge components, as in the first embodiment.

As for the method of the component separation, either the addition type separation or the multiplication type separation may be used. Moreover, as for the method of the process for reducing noise in the second component V, it is not limited to the soft decision threshold processing, and any method can be applied as long as it is signal processing dependant on the signal level.

Furthermore, in this embodiment, although the luminance component Y is separated from the first component and the noise reduction processing parameters T1, T2 are set according to the signal level of the luminance component Y, a signal level of the signal obtained by interpolating a G component which mostly reflects the luminance component Y may be used instead of the signal level of the luminance component Y.

Fourth Embodiment

Figure 12:
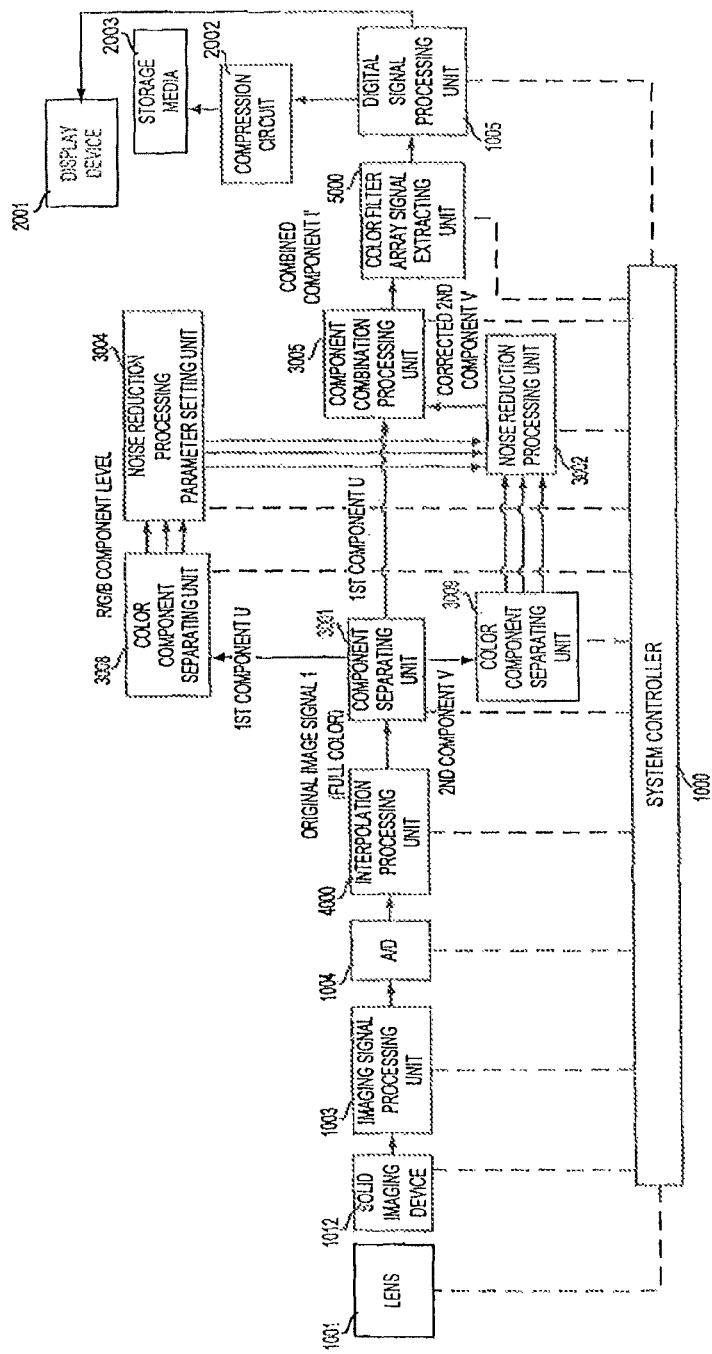
FIG. 12 depicts a system configuration diagram of an imaging apparatus according to a fourth embodiment.

FIG. 12 depicts a system configuration diagram of the image apparatus according to the fourth embodiment. Same reference numerals are assigned and the descriptions are omitted for the structures in common with the previous embodiments.

Although the units from the component separating unit 3001 to the component combination processing unit 3005 are arranged in the latter stage of the digital signal processing unit 1005 in the first embodiment, those elements are arranged in the front stage of the digital signal processing unit 1005 in the fourth embodiment as shown in FIG. 12, and the component separation and the noise reduction processing are performed to the signal immediately after the A/D conversion (the signal before performing the digital signal processing). In this case, assuming that the component separation will be performed, the signal obtained through the color filter array is de-mosaiced at the interpolation processing unit 4000 in order to obtain the full color signal (original image signal I) once.

Then, the noise reduction processing parameters T1, T2 are set for each of the color components using the signal level to noise variance model based on the signal level of each of the color components in the fourth embodiment, as in the second embodiment. Since the signal separation and the noise reduction processing are performed at the front stage of the digital signal processing in the fourth embodiment, a model expressed in FIG. 13 or at Expression (12), (13) is referenced to acquire the noise variance σ as the signal level to noise variance model, instead of the model shown in FIG. 2.

As for the noise reduction processing of the second component V using the soft decision threshold processing, and the combination processing of the first component U and the corrected second component V', performed thereafter, they are similar to the second embodiment.

According this fourth embodiment, the original image signal I is adapted to the case where a plurality of color components are included, and therefore, the deterioration of the edge components is suppressed and high image quality noise reduction processing can be performed as in the first embodiment. Since the component separation and the noise reduction processing are performed at the front stage of the digital image processing unit, the ability to separate the skeleton component and the noise component in the component separating unit 3001 improves.

As for the method of the component separation, it may used either the addition type separation or the multiplication type separation. As for the method of the process for reducing noise in the second component V, it is not limited to the soft decision threshold processing and any method may be used as long as it is signal processing dependant on the signal level.

Although the noise variance σ is acquired based on the signal level of each of the color components to set the corresponding noise reduction processing parameters T1, T2 in the fourth embodiment, it may use the signal level of the luminance component Y obtained by converting all of the color components immediately after the A/D conversion, or the signal level of the signal obtained by interpolating the G component which mostly reflects the luminance component Y, instead of the signal level for each of the color components.

Fifth Embodiment

Although the local inter-color coefficient of cross correlation (hereinafter referred to as a "coefficient of correlation") evaluated from the 3×3 neighboring area shows a positive value close to 1 in a color image that does not include noise, since pixels with reduced coefficient of correlation is included in a color image including noise, its coefficient of correlation evaluated from the neighboring area is reduced. For this reason, the smaller the value of the coefficient of correlation is, the larger the amount of noise included in the image signal.

Therefore, in the fifth embodiment, the noise reduction processing parameters T1, T2 of the soft decision threshold processing are corrected according to the correlations between the color components. Thereby, the gap in the soft decision threshold processing is reduced to function so as to maintain the original image signal I more in areas having large correlation, and meanwhile, the gap in the soft decision threshold processing is widened in areas having small correlations, and therefore, the original image signal I can be equalized to achieve noise reduction processing with improved accuracy.

Figure 14:
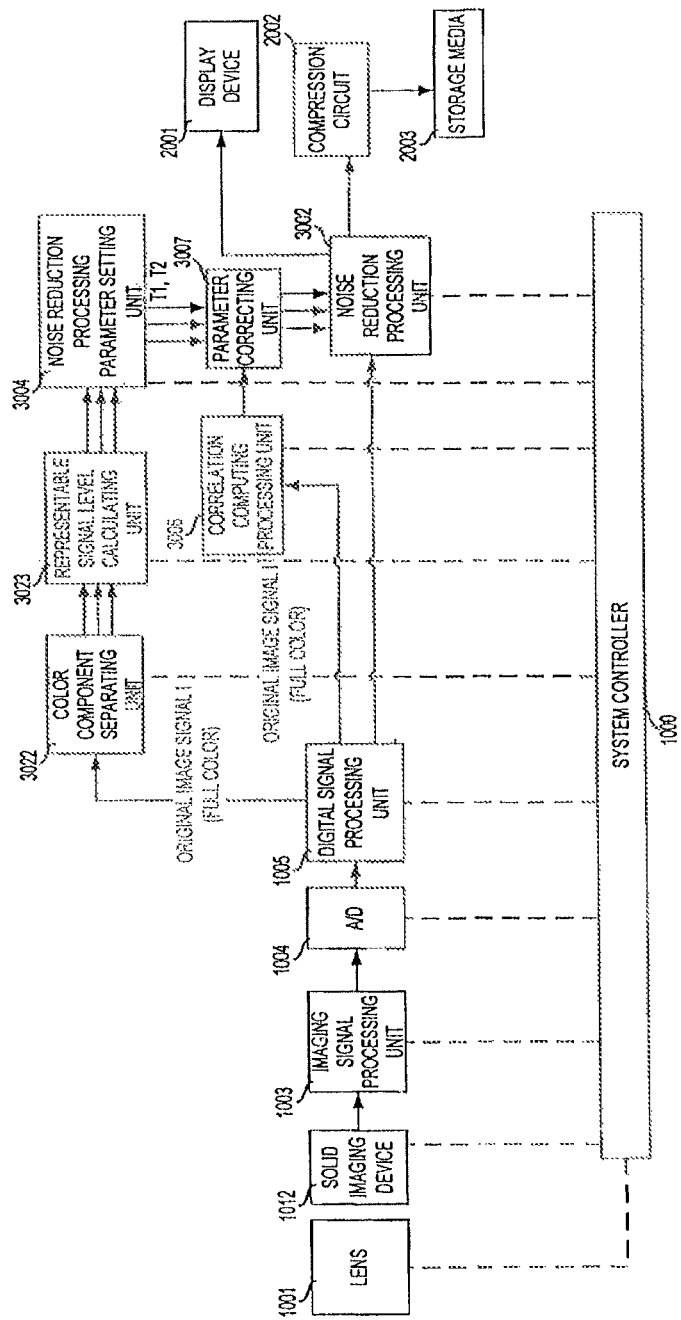
FIG. 14 depicts a system configuration diagram of an imaging apparatus according to a fifth embodiment.

FIG. 14 depicts a system configuration diagram of the imaging apparatus according to the fifth embodiment. Same reference numerals are assigned and the descriptions are omitted for the structures in common with the previous embodiments.

The original image signal I (a full color signal) output from the digital signal processing unit 1005 is transmitted to a color component separating unit 3022, a correlation arithmetic processing unit 3006, and a noise reduction processing unit 3002.

The color component separating unit 3022 separates the original image signal I into each of the color components, and a representative signal level for a neighboring area of a certain pixel location is calculated for each of the separated color components at the representative signal level calculating unit 3023. Upon calculating the representative signal level, non-linear filters, such as linear filters and median filters, non-linear dispersion filters, such as bilateral filters, and morphologic filters, etc. may be used.

At the noise reduction processing parameter setting unit 3004, the signal level to noise variance model shown in FIG. 2 or its approximate data is referenced to acquire the noise variance σ that corresponds to the representative signal level of each of the color components. Then, the noise reduction processing parameters T1, T2 for each of the color components are set to values that correspond to the noise variance σ of the corresponding color component, e.g. values proportional to the noise variance σ.

At the correlation arithmetic processing unit 3006, the coefficient of correlation is calculated for each of the color components in a neighboring area including a location of a pixel of interest, to output a minimum coefficient of correlation r which is its minimum value, as will be described later.

At the parameter correcting unit 3007, the noise reduction processing parameters T1, T2 for each of the color components are corrected by calculating the coefficient of correction C based on the minimum coefficient of correlation r, and multiplying it with the noise reduction processing parameters T1, T2 for each of the color components.

At the noise reduction processing unit 3002, the soft decision threshold processing using the noise reduction processing parameters T1, T2 after the correction is performed independently for each of the color components, to reduce the noise dependant on the signal level included the original image signal I.

Correlation Arithmetic Processing and the Correction of the Noise Reduction Processing Parameters T1, T2

The details of the correction of the noise reduction processing parameters T1, T2 corresponding to the correlations between the color components will be described showing specific examples. The original image signal I is assumed one-dimensional herein for simplifying the description.

Figure 15:
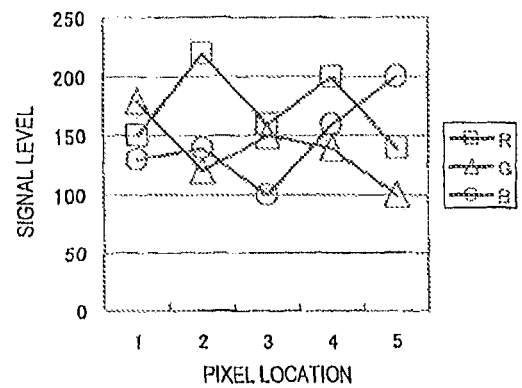
FIG. 15 depicts a graph showing an example of a one-dimensional image signal with no correlation between the color components.
Figure 16:
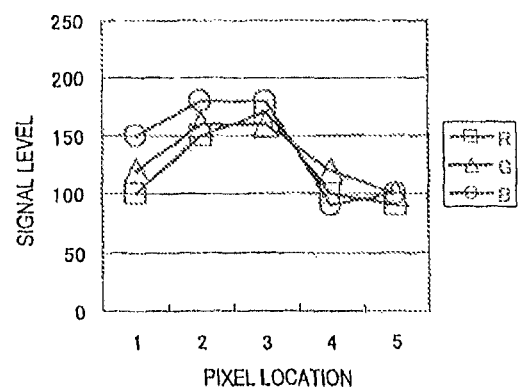
FIG. 16 depicts a graph showing an example of a one-dimensional image signal with no correlation between the color components.

FIG. 15 and FIG. 16 show the relationship between the pixel locations of the original image signal I and the signal levels for each of the color components. In the example shown in FIG. 15, there is no correlation between the color components, and in this case, the signal level for each of the color components for each of the pixel locations is:

| Pixel location | R | G | B |
| --- | --- | --- | --- |
| 1 | 150 | 180 | 130 |
| 2 | 220 | 120 | 140 |
| 3 | 160 | 150 | 100 |
| 4 | 200 | 140 | 160 |
| 5 | 140 | 100 | 200 |

Now, obtaining each of the coefficients of correlation between R-G, G-B, and B-R results in:

|  | R-G | G-B | B-R |
| --- | --- | --- | --- |
| Coefficient of correlation | −0.15836 | −0.69668 | −0.14106 | and the minimum coefficient of correlation r results in −0.69668.

On the other hand, there are correlations between the color components in the example shown in FIG. 16, and the signal level for each of the color components at each of the pixel locations is:

| Pixel location | R | G | B |
| --- | --- | --- | --- |
| 1 | 100 | 120 | 150 |
| 2 | 150 | 160 | 180 |
| 3 | 170 | 160 | 180 |
| 4 | 100 | 120 | 90 |
| 5 | 90 | 100 | 100 |

Now, obtaining each of the coefficients of correlation between R-G, G-B, and B-R results in:

|  | R-G | G-B | B-R |
| --- | --- | --- | --- |
| coefficients of correlation | 0.9962099 | 0.866459 | 0.848117 | and the minimum coefficient of correlation r results in 0.848117.

In the fifth embodiment, the noise reduction processing parameters T1, T2 are respectively corrected by the following Expression (16) using the minimum coefficient of correlation r:

$$T1 \leftarrow c(1-r)^2 T1$$
$$T2 \leftarrow c(1-r)^2 T2 \quad (16)$$

If we assume c=1, the coefficient of correction C of the noise reduction processing parameters T1, T2 becomes $(1-r)^2$, and consequently, the coefficients of correction C result in 2.878739 in the case of FIG. 15, and 0.023069 in the case of FIG. 16.

Therefore, if there are no correlations between the color components as in FIG. 15, the correction is performed so that the gap between the upper threshold and the lower threshold of the soft decision threshold is widened, and as a result, it functions to increase the smoothness of the original signal. On the other hand, if there are correlations between the color components as in FIG. 16, the correction is performed so as to reduce the gap between the upper threshold and the lower threshold of the soft decision threshold to perform a small correction which maintains the signal more.

Thus, by performing the correction of the noise reduction processing parameters T1, T2 of the soft decision threshold processing according to the correlations between the color components, it became possible to distinguish between the component due to the noise and the component due to the structure of the nature of the image, such as the texture, among the varying components included in the original image signal I, and to suppress the latter component from the deterioration caused in the noise reduction processing.

Although the noise variance σ is obtained from the representative signal level herein to set the corresponding noise reduction processing parameters T1, T2, the signal level of the luminance component Y obtained by converting all of the color components, or the signal level of the signal obtained by interpolating the G component which mostly reflects the luminance component Y may be used instead of the representative signal level.

Sixth Embodiment

Figure 17:
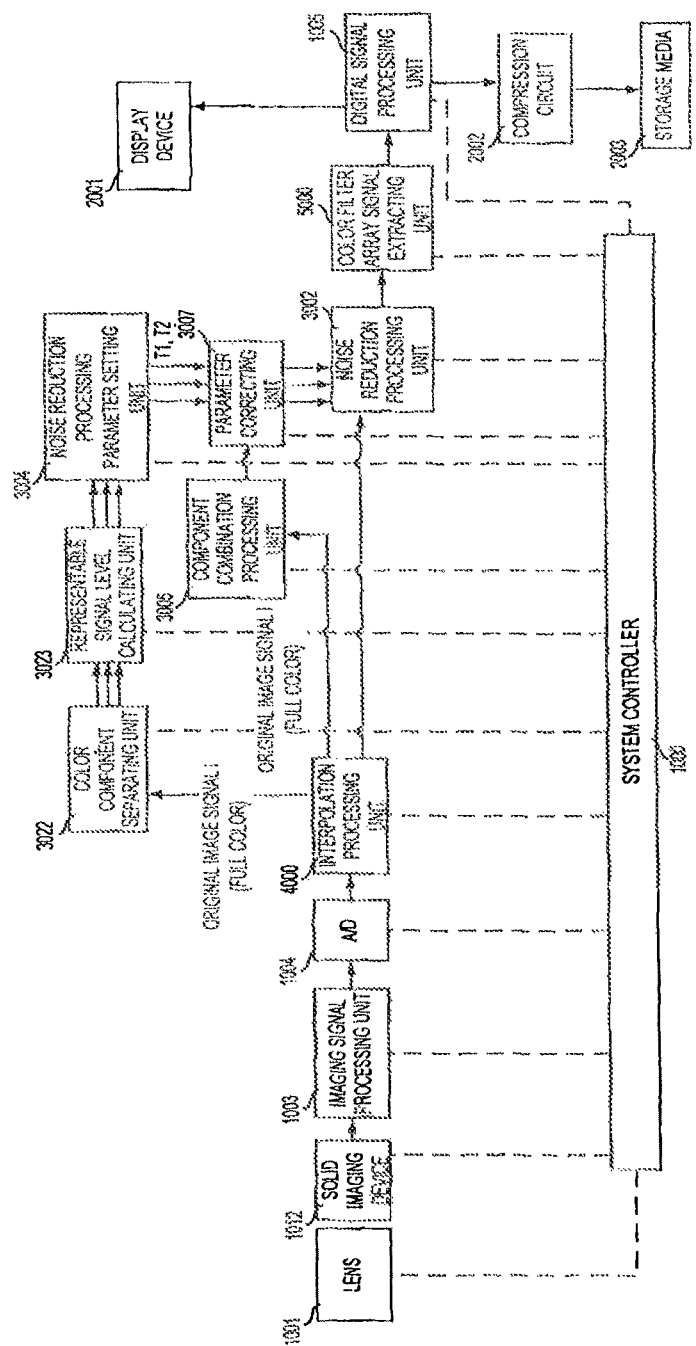
FIG. 17 depicts a system configuration diagram of the imaging apparatus according to the sixth embodiment.

FIG. 17 depicts a system configuration diagram of the image apparatus according to the sixth embodiment. Same reference numerals are assigned and the descriptions are omitted for the structures in common with the previous embodiments.

In the sixth embodiment, the soft decision threshold processing is performed to the signal immediately after the A/D conversion (the signal before performing the digital signal processing), as in the fourth embodiment. Therefore, in the sixth embodiment, the signal obtained through the color filter array is de-mosaiced to at the interpolation processing unit 4000, in order to obtain the full color signal (the original image signal I) once.

Figure 13:
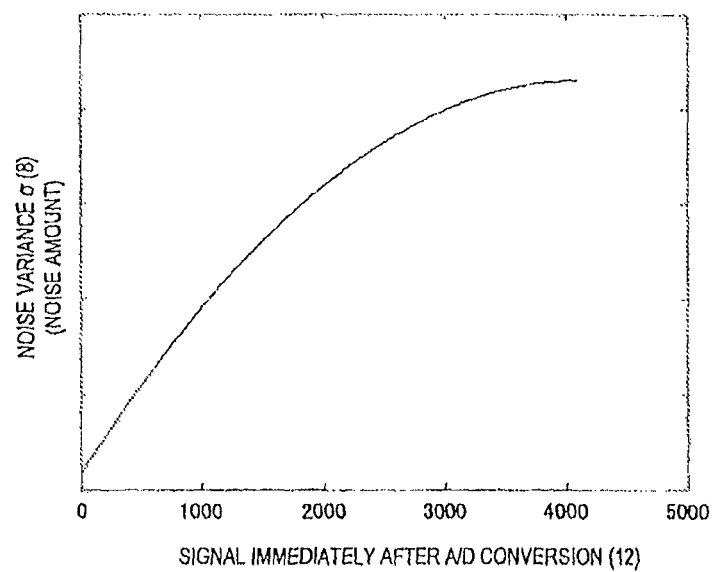
FIG. 13 depicts a signal level to noise variance model before the digital signal processing.

Furthermore, since the component separation and the noise reduction processing are performed before applying the digital signal processing, the noise variance σ is acquired for each of the color components by referring the model expressed in FIG. 13 or at Expression (12), (13) as the model of the signal level to the noise variance σ for each of the color components at the noise reduction processing parameter setting unit 3004, instead of the model shown in FIG. 2, to set the corresponding noise reduction processing parameters T1, T2 for each of the color components. The noise reduction processing parameters T1, T2 are set to values proportional to the noise variance σ, for example.

The correction of the noise reduction processing parameters T1, T2 of the soft decision threshold processing using the correlations between the color components is performed at the parameter correcting unit 3007 by Expression (16) as in the fifth embodiment. At the noise reduction processing unit 3002, the soft decision threshold processing using the noise reduction processing parameters T1, T2 after the correction is performed to the original image signal I, to reduce the noise dependant on the signal level included in the original image signal I.

At the color filter array signal extracting unit 5000, the signal for a location that corresponds to the arrangement in the color filter array is retrieved from the image signal that underwent the noise reduction processing, to transmit the image signal to the digital signal processing unit 1005. The signal that underwent the digital signal processing is transmitted to the displaying device 2001 and the storage media 2003 at the latter stage.

In the sixth embodiment, by correcting the noise reduction processing parameters T1, T2 of the soft decision threshold processing in accordance with the correlations between the color components as in the fifth embodiment, it became possible to distinguish between a component caused by the noise and a component caused by the structure of the nature of the image, such as the texture, among the varying components included in the original image signal I, to suppress the latter component caused by the structure of the nature of the image from the deterioration caused by the noise reduction processing.

Although the noise variance σ is obtained from the representative signal level herein to set the corresponding noise reduction processing parameters T1, T2, the signal level of the luminance component Y obtained by converting all of the color components immediately after the A/D conversion, or the signal level of the signal obtained by interpolating the G component which mostly reflects the luminance component Y may be used instead of the representative signal level.

Seventh Embodiment

Figure 18:
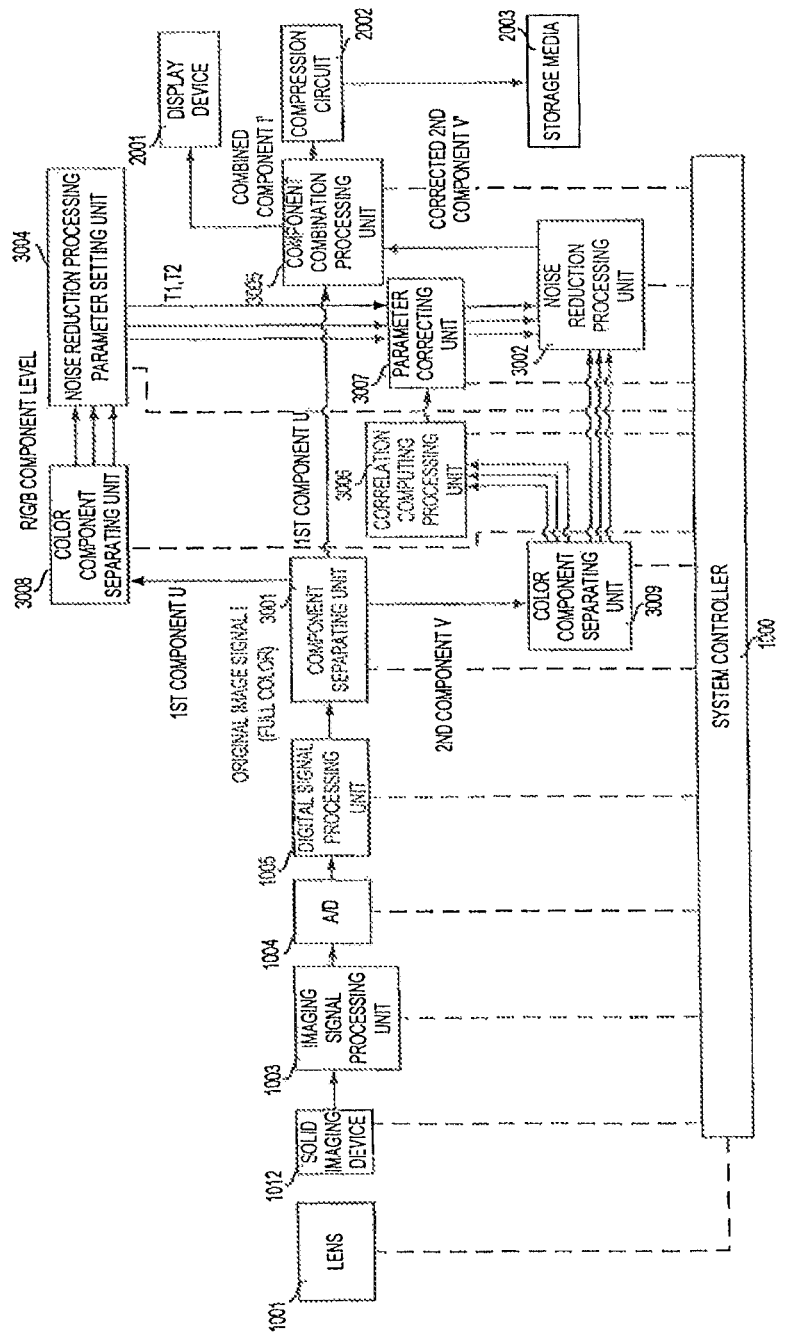
FIG. 18 depicts a system configuration diagram of the imaging apparatus according to the seventh embodiment.

FIG. 18 depicts a system configuration diagram of the imaging apparatus according to the seventh embodiment. Same reference numerals are assigned and the descriptions are omitted for the structures in common with the previous embodiments.

In the seventh embodiment, it performs the soft decision threshold processing after the component separation shown in the second embodiment, in addition to the correction of the noise reduction processing parameters T1, T2 that correspond to the correlations between the color components shown in the fifth and sixth embodiment. However, compared with the fifth and sixth embodiment, the correlation calculation between the color components is performed for the second component V that was separated from the original image signal I.

The first component U separated from the original image signal I is transmitted to the color component separating unit 3008 to acquire the signal level for each of the color components at the color component separating unit 3008.

At the noise reduction processing parameter acquiring unit 3004, a signal level to noise variance model is referenced to acquire the noise variance σ for each of the color components, based on the signal level of each of the color components. Thereafter, the noise reduction processing parameters T1, T2 for each of the color components are set to values corresponding to the noise variance σ of the corresponding color component, e.g. values proportional to the noise variance σ.

The second component V separated from the original image signal I is transmitted to the correlation arithmetic processing unit 3006 after it is separated into each of the color components at the color component separating unit 3009, and the correlation arithmetic processing is performed for each of the color signals to the second component V at the correlation arithmetic processing unit 3006 as in the fifth and sixth embodiments, to calculate the minimum coefficient of correlation r.

At the parameter correcting unit 3007, the coefficient of correction C of the noise reduction processing parameters T1, T2 is computed based on the minimum coefficient of correction r, and the result is multiplied by the noise reduction processing parameters T1, T2 for each of the color components to correct the noise reduction processing parameters T1, T2 for each of the color components.

At the noise reduction processing unit 3002, the soft decision threshold processing is performed independently for each of the color components to each of the color components of the second component V using the corrected noise reduction processing parameters T1, T2 to reduce the noise included in each of the color components. Then, the obtained signal is output as the corrected second component V'.

At the component combination processing unit 3005, the first component U and the corrected second component V' are combined in a predetermined proportion, e.g. 1:1, to obtain the combined component I' in which the noise is reduced from the original image signal I.

The Correlation Arithmetic Processing and the Correction of the Noise Reduction Processing Parameters T1, T2

The details of the correction of the noise reduction processing parameters T1, T2 corresponding to the correlation between the color components will be described with reference to specific examples. The second component V is assumed to be one-dimensional herein for simplifying the description. Since the second component V is a residual component of the original image signal I after the first component U is removed, and includes fine structure components like textures, the second component V is a varying component with zero being the center of the variation.

Figure 19:
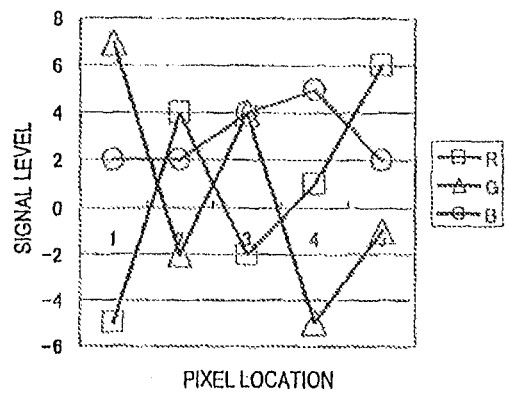
FIG. 19 depicts a graph showing an example of a one-dimensional image signal with no correlation between the color components.
Figure 20:
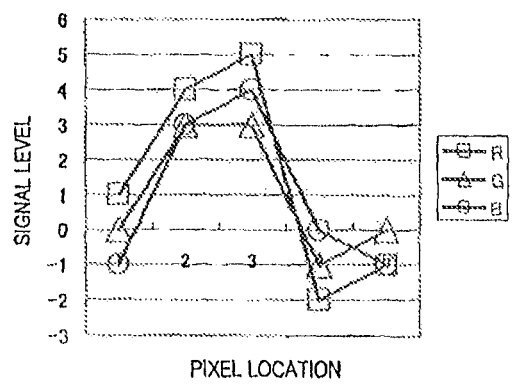
FIG. 20 depicts a graph showing an example of a one-dimensional image signal with no correlation between the color components.

FIGS. 19 and 20 show relationships between the pixel location of the second component V and the signal level for each of the color components.

In the example shown in FIG. 19, there are no correlations between the color components, and the signal level for each of the color components at each pixel location is:

| Pixel location | R | G | B |
|---|---|---|---|
| 1 | −5 | 7 | 2 |
| 2 | 4 | −2 | 2 |
| 3 | −2 | 4 | 4 |
| 4 | 1 | −5 | 5 |
| 5 | 6 | −1 | 2 |

Obtaining each of the coefficients of correlation between R-G, G-B, and B-R results in:

|  | R-G | G-B | B-R |
|---|---|---|---|
| Coefficient of correlation | −0.75148 | −0.36622 | −0.19914 | and the minimum coefficient of correlation r results in −0.75148.

On the other hand, in the example shown in FIG. 20, there are correlations between the color components, and the signal level for each of the color components at each pixel location is:

| Pixel location | R | G | B |
|---|---|---|---|
| 1 | 1 | 0 | −1 |
| 2 | 4 | 3 | 3 |
| 3 | 5 | 3 | 4 |
| 4 | −2 | −1 | 0 |
| 5 | −1 | 0 | −1 |

Obtaining each of the coefficients of correlation between R-G, G-B, and B-R results in:

|  | R-G | G-B | B-R |
|---|---|---|---|
| Coefficient of correlation | 0.964023 | 0.911685 | 0.873891 | and the minimum coefficient of correlation r results in 0.873891.

By calculating the minimum coefficient of correlation r as above, the noise reduction processing parameters T1, T2 are respectively corrected by Expression (16) which was used in the fifth embodiment. If we assume c=1, the coefficient of correction C for the noise reduction processing parameters T1, T2 becomes $(1-r)^2$, and the coefficients of correction C result in 3.0677 for FIG. 19 and 0.01590 for FIG. 20.

Thus, if there are no correlations between the color components as in FIG. 19, the correction is performed so that the gap between the upper threshold and the lower threshold of the soft decision threshold widens, and therefore it improves the smoothness of the signal. Thus, if there are correlations between the color components as in FIG. 20, the correction is performed so that the gap between the upper threshold and the lower threshold of the soft decision threshold is reduced, and therefore a small correction that maintains the signal more is performed.

Figure 21:
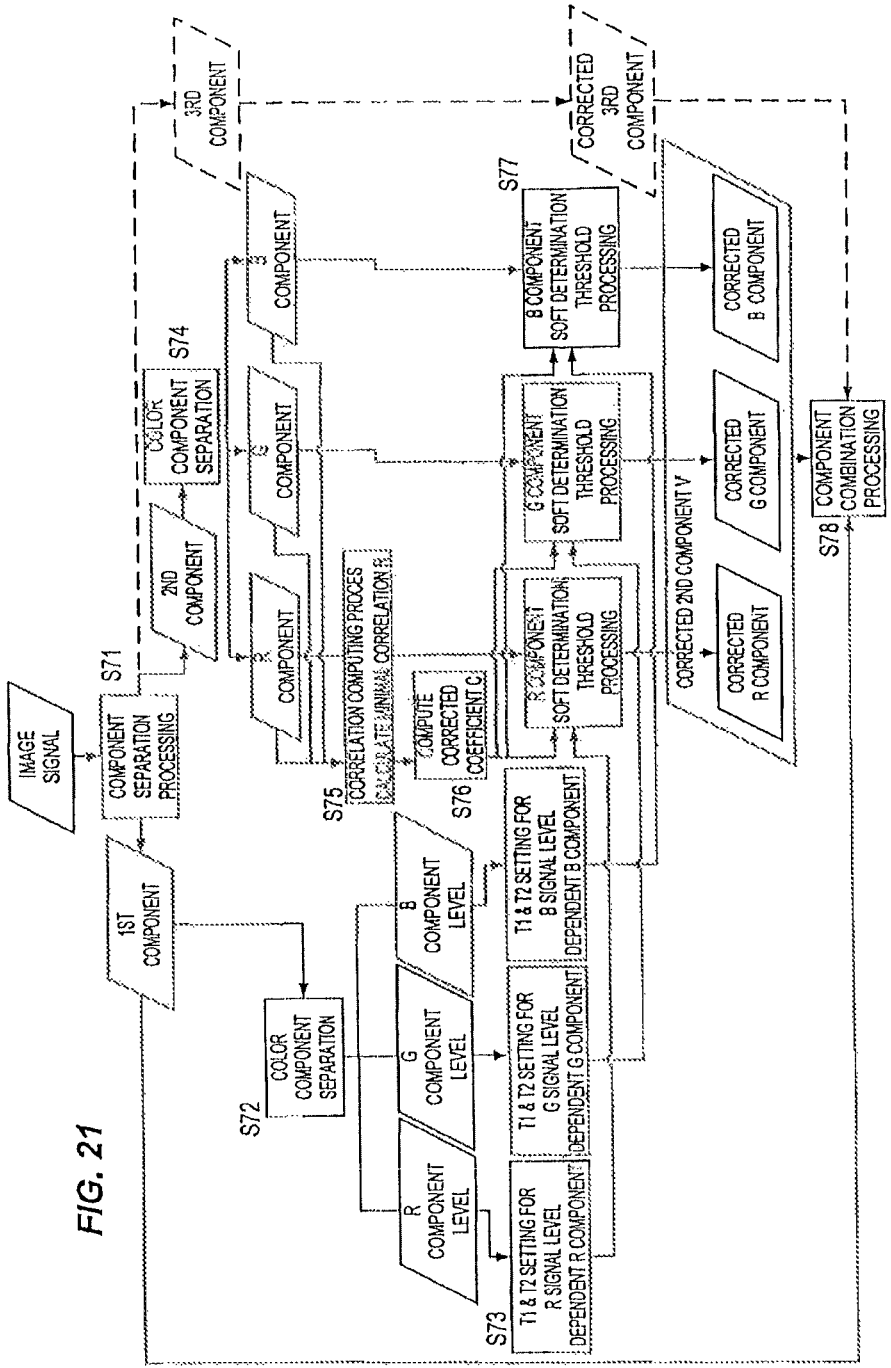
FIG. 21 depicts a flow chart that corresponds to a process from the component separating unit to the component combination processing unit in the seventh embodiment.

FIG. 21 depicts a flow chart that corresponds to a process from the component separating unit to the component combination processing unit 3005. The process that separates the original image signal I into three components is represented with dashed lines for the purpose of reference but a case that involves a separation into two components will be described herein.

In step S71, the original image signal I is separated into the first component U and the second component V.

In step S72, the first component U is separated into each color component to obtain the signal level for each color component.

In step S73, the signal level to noise variance model shown in FIG. 2 or its approximate data is referenced to acquire the noise variance σ, and in accordance with the result, the noise reduction processing parameters T1, T2 are set for each color component.

In step S74, the second component V is separated into each color component.

In step S75, the correlations between each color component of the second component V are calculated to obtain the minimum coefficient of correlation r.

In step S76, the coefficient of correction C of the noise reduction processing parameters T1, T2 is calculated for each color signal obtained in step S73 based on the minimum coefficient of correlation r.

In step S77, the coefficient of correction C is multiplied to the noise reduction processing parameters T1, T2 to correct the noise reduction processing parameters T1, T2. Then, the soft decision threshold processing is performed to each color component of the second component V using the noise reduction processing parameters T1, T2 that underwent the correction to obtain the corrected second component V'.

In step S78, the first component U and the corrected second component V' are combined to obtain a combined component I' in which the noise is reduced from the original image signal I.

According to the seventh embodiment, even if the original image signal I included a plurality of color components, it is possible to suppress the deterioration of edge components as in the first embodiment and also perform high image quality noise reduction processing.

Furthermore, by correcting the noise reduction processing parameters T1, T2 of the soft decision threshold processing according to the correlation between the color components, it is able to distinguish the component originated by the noise and the component originated by the structure of the nature of the image such as the texture, among the varying components included in the second component V, and it is therefore possible to suppress the deterioration of the latter component originated by the structure of the nature of the image caused by the noise reduction processing.

As for the method of the component separation, either the addition type separation or the multiplication type separation may be used. Moreover, as for the method of the process for reducing the noise in the second component V, it is not limited to the soft decision threshold processing, and any method can be used as long as it is signal processing dependent on the signal level.

Although the noise variance σ is acquired based on the signal level for each color signal of the first component U and the corresponding noise reduction processing parameters T1, T2 are set herein, the signal level of the luminance component Y that is separated from the first component, or the signal level of the signal obtained by interpolating the G component that mostly reflects the luminance component Y may be used instead of the signal level for each color signal of the first component U.

Eighth embodiment

Figure 22:
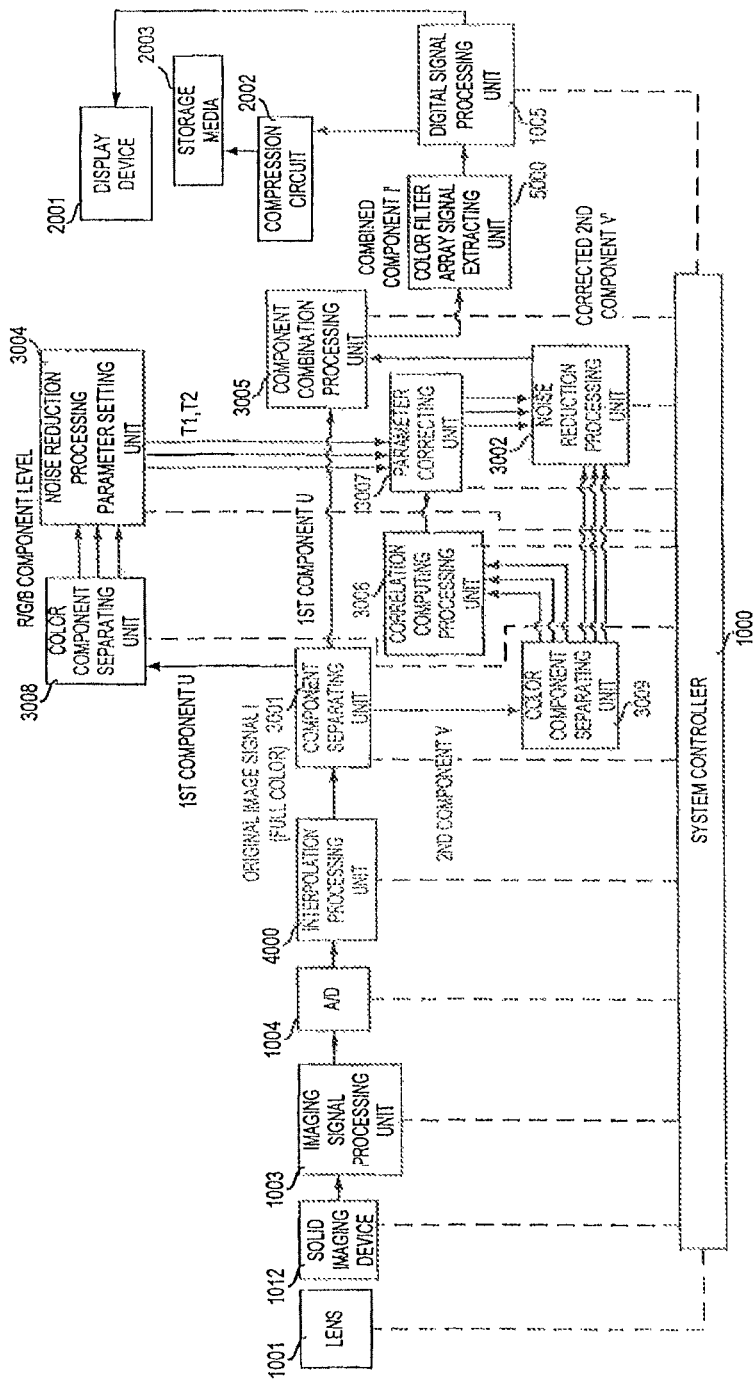
FIG. 22 depicts a system configuration diagram of the imaging apparatus according to the eighth embodiment.

FIG. 22 depicts a system configuration diagram of the imaging apparatus according to the eighth embodiment.

Same reference numerals are assigned and the descriptions are omitted for the structures in common with the previous embodiments.

In the eighth embodiment, the component separation and the noise reduction processing are performed to the signal immediately after the A/D conversion (the signal before undergoing the digital signal processing) as in the fourth and the sixth embodiments. In this case, assuming that the component separation will be performed, the signal obtained through the color filter array is de-mosaiced at the interpolation processing unit 4000 in order to obtain the full color signal (the original image signal I) once.

Moreover, since the component separation and the noise reduction processing are performed before applying the digital signal processing, the noise reduction processing parameter setting unit 3004 acquires the noise variance σ for each color component using the model expressed in FIG. 13 or at Expression (12), (13), as the signal level to noise variance model of each color component, instead of the model shown in FIG. 2. Then, the noise reduction processing parameters T1, T2 for each color component are set to values that correspond to the noise variance σ of the corresponding color component, e.g. values proportional to the noise variance σ.

The noise reduction processing of the soft decision threshold processing performed later is similar to other embodiments. The correction of the noise reduction processing parameters T1, T2 using the correlation between the color components is similar to the fifth embodiment, and the noise reduction processing parameters T1, T2 are corrected by Expression (16) in accordance with the minimum coefficient of correlation r.

The corrected second component V' output from the noise reduction processing unit 3002 is combined with the first component U at the component combination processing unit 3005. At the color filter array signal extracting unit 5000, the signal at a corresponding location in the array of color filter array is retrieved from the combined component I' to transmit the image signal to the digital signal processing unit 1005.

According to the eighth embodiment, even if the original image signal I included a plurality of color components, it is possible to suppress the deterioration of edge components as in the first embodiment and also perform high image quality noise reduction processing.

Furthermore, by correcting the noise reduction processing parameters T1, T2 of the soft decision threshold processing according to the correlation between the color components, it is able to distinguish the component originated by the noise and the component originated by the structure of the nature of the image such as the texture, among the varying components included in the second component V, and it is therefore possible to suppress the deterioration of the latter component originated by the structure of the nature of the image caused by the noise reduction processing.

Furthermore, since the component separation and the noise reduction processing are performed at the front stage of the digital signal processing unit 1005, the ability of the component separating unit 3001 to separate into the skeleton component and the noise component is improved.

As for the method of the component separation, either the addition type separation or the multiplication type separation may be used. Moreover, as for the method of the process for reducing the noise in the second component V, it is not limited to the soft decision threshold processing, and any method can be used as long as it is signal processing dependent on the signal level.

Although the noise variance σ is acquired based on the signal level for each color signal of the first component U and the corresponding noise reduction processing parameters T1, T2 are set herein, the signal level of the luminance component Y that is obtained by converting all of the color components immediately after the A/D conversion or the signal level of the signal obtained by interpolating the G component that mostly reflects the luminance component Y may be used instead of the signal level of each color signal of the first component U.

While the present invention has been described with reference to the embodiments, the above embodiments are shown as examples of applications of the present invention, and it is not meant to limit the technical scope of the present invention to the specific arrangements of the above embodiments.

What is claimed is:

1. An image processing apparatus comprising:
   a component separating unit which separates an original image signal comprising a plurality of color components into a plurality of components including a first component which is a skeleton component including a flat component and an edge component of an image, and a second component which is obtained from a residual of the original image signal after the first component is removed, both the first and second components comprise the plurality of color components;
   a signal level acquiring unit which acquires either one of a signal level of a luminance component of the first component and a signal level of a signal obtained by interpolating a G component of the first component;
   a parameter setting unit which sets a noise reduction processing parameter corresponding to each of the color components of the second component based on either one of the signal level of the luminance component of the first component and the signal level of the signal obtained by interpolating the G component of the first component; and
   a noise reducing unit which reduces noise in each of the color components of the second component using the noise reduction processing parameter of the corresponding color component.

2. The image processing apparatus according to claim 1, wherein
   the noise reducing unit reduces noise in the second component based on a result of a comparison between a threshold set in accordance with the noise reduction processing parameter and the second component.

3. The image processing apparatus according to claim 1, further comprising:
   a combination unit which combines the first component and the second component in which the noise is reduced by the noise reducing unit.

4. The image processing apparatus according to claim 1, wherein
   the component separating unit separates the original image signal into a plurality of components which include the first component and the second component by an addition type separation.

5. The image processing apparatus according to claim 1, wherein
   the component separating unit separates the original image signal into a plurality of components which include the first component and the second component by a multiplication type separation.

6. The image processing apparatus according to claim 1, further comprising:
   a digital signal processing unit which performs a tone conversion, and wherein the original image signal is a signal before the tone conversion is performed by the digital signal processing unit.

7. The image processing apparatus according to claim 3, further comprising:
   a signal generating unit which retrieves a color signal which corresponds to a predetermined color filter arrangement from the signal obtained by the combining unit.

8. An imaging apparatus comprising:
   an imaging device at a front of which a color filter array is arranged;
   a component separating unit which separates an original image signal comprising a plurality of color components obtained from the imaging device into a plurality of components including a first component which is a skeleton component including a flat component and an edge component of an image, and a second component which is obtained from a residual of the original image signal after the first component is removed, both the first and second components comprise the plurality of color components;
   a signal level acquiring unit which acquires either one of a signal level of a luminance component of the first component and a signal level of a signal obtained by interpolating a G component of the first component;
   a parameter setting unit which sets a noise reduction processing parameter corresponding to each of the color components of the second component based on either one of the signal level of the luminance component of the first component and the signal level of the signal obtained by interpolating the G component of the first component; and
   a noise reducing unit which reduces noise in each of the color components of the second component using the noise reduction processing parameter of the corresponding color component.

9. A method for processing an image comprising:
   a component separating step for separating an original image signal comprising a plurality of color components into a plurality of components including a first component which is a skeleton component including a flat component and an edge component of an image, and a second component which is obtained from a residual of the original image signal after the first component is removed, both the first and second components comprise the plurality of color components;
   a signal level acquiring step for acquiring either one of a signal level of a luminance component of the first component and a signal level of a signal obtained by interpolating a G component of the first component;
   a parameter setting step for setting a noise reduction processing parameter corresponding to each of the color components of the second component based on either one of the signal level of the luminance component of the first component and the signal level of the signal obtained by interpolating the G component of the first component; and
   a noise reducing step for reducing noise in each of the color components of the second component using the noise reduction processing parameter of the corresponding color component.

* * * * *